US 11,558,880 B2

(12) United States Patent
Ryu et al.

(10) Patent No.: US 11,558,880 B2
(45) Date of Patent: Jan. 17, 2023

(54) SIDELINK GROUPCAST SCHEDULING

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Hong Cheng, Basking Ridge, NJ (US); Juan Montojo, San Diego, CA (US); Kapil Gulati, Belle Mead, NJ (US); Mahmoud Taherzadeh Boroujeni, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 17/071,877

(22) Filed: Oct. 15, 2020

(65) Prior Publication Data

US 2021/0127403 A1 Apr. 29, 2021

Related U.S. Application Data

(60) Provisional application No. 62/925,706, filed on Oct. 24, 2019.

(51) Int. Cl.
*H04L 5/00* (2006.01)
*H04W 72/12* (2009.01)
(Continued)

(52) U.S. Cl.
CPC ......... *H04W 72/121* (2013.01); *H04L 1/0003* (2013.01); *H04W 28/0278* (2013.01);
(Continued)

(58) Field of Classification Search
None
See application file for complete search history.

(56) References Cited

U.S. PATENT DOCUMENTS 9,572,063 B2  2/2017 Etemad et al.
2010/0214169 A1  8/2010 Kafle
(Continued)

FOREIGN PATENT DOCUMENTS

WO  WO-2017111883 A1  6/2017
WO  WO-2019009454 A1  1/2019
(Continued)

OTHER PUBLICATIONS

International Search Report and Written Opinion—PCT/US2020/056098—ISA/EPO—dated Dec. 15, 2020
(Continued)

*Primary Examiner* — Sithu Ko
(74) *Attorney, Agent, or Firm* — Holland & Hart LLP/QUALCOMM Incorporated

(57) ABSTRACT

Methods, systems, and devices for wireless communications are described. A first user equipment (UE) may transmit, to a base station, a sidelink scheduling request for groupcast sidelink communications with a set of one or more UEs. The base station may determine one or more UEs of the set of UEs and time-frequency resources for groupcast sidelink communication between the first UE and the one or more UEs. The first UE may receive, from the base station, a groupcast sidelink grant that indicates time-frequency resources for groupcast sidelink communications between the first UE and one or more UEs. The first UE may transmit, via the time-frequency resources indicated by the groupcast sidelink grant, a groupcast sidelink message to the one or more UEs. The one or more UEs may also receive the sidelink grant, and may monitor the time-frequency
(Continued)

resources for a groupcast sidelink communication from the first UE.

56 Claims, 17 Drawing Sheets

(51) Int. Cl.
  *H04W 72/14* (2009.01)
  *H04W 72/04* (2009.01)
  *H04W 76/27* (2018.01)
  *H04W 80/02* (2009.01)
  *H04W 28/02* (2009.01)
  *H04L 1/00* (2006.01)

(52) U.S. Cl.
  CPC ....... *H04W 72/042* (2013.01); *H04W 72/046* (2013.01); *H04W 72/0446* (2013.01); *H04W 72/0453* (2013.01); *H04W 72/14* (2013.01); *H04W 76/27* (2018.02); *H04W 80/02* (2013.01)

(56) References Cited

U.S. PATENT DOCUMENTS

| | | | |
|---|---|---|---|
| 2012/0120892 | A1 | 5/2012 | Freda et al. |
| 2013/0294318 | A1 | 11/2013 | Amerga et al. |
| 2015/0011230 | A1* | 1/2015 | Noh ............... H04W 72/04 455/450 |
| 2016/0338095 | A1* | 11/2016 | Faurie ............ H04W 28/0278 |
| 2017/0171837 | A1* | 6/2017 | Chen ................ H04W 72/04 |
| 2018/0035448 | A1 | 2/2018 | Gupta et al. |
| 2018/0091262 | A1 | 3/2018 | Jung et al. |
| 2018/0139724 | A1* | 5/2018 | Loehr .............. H04W 72/02 |
| 2018/0206257 | A1* | 7/2018 | Lee ................. H04W 28/02 |
| 2018/0249453 | A1 | 8/2018 | Nagaraja et al. |
| 2019/0045569 | A1 | 2/2019 | Abedini et al. |
| 2019/0174346 | A1 | 6/2019 | Murray et al. |
| 2019/0268918 | A1 | 8/2019 | Baghel et al. |
| 2019/0372647 | A1 | 12/2019 | Su et al. |
| 2020/0022089 | A1* | 1/2020 | Guo ............... H04W 52/383 |
| 2020/0092685 | A1* | 3/2020 | Fehrenbach ......... H04W 4/46 |
| 2020/0119895 | A1 | 4/2020 | Choi et al. |
| 2020/0178221 | A1 | 6/2020 | Byun et al. |
| 2020/0187236 | A1 | 6/2020 | Moon et al. |
| 2021/0127381 | A1 | 4/2021 | Ryu et al. |
| 2021/0127404 | A1 | 4/2021 | Ryu et al. |
| 2021/0168574 | A1 | 6/2021 | Zhang et al. |
| 2021/0175943 | A1 | 6/2021 | Xu et al. |
| 2021/0219268 | A1 | 7/2021 | Li et al. |
| 2021/0274545 | A1* | 9/2021 | Adjakple ......... H04W 28/0268 |
| 2021/0344407 | A1 | 11/2021 | Huang et al. |
| 2021/0345396 | A1* | 11/2021 | Yu ................. H04W 52/383 |
| 2022/0007403 | A1* | 1/2022 | Li ................. H04W 72/1289 |
| 2022/0132603 | A1 | 4/2022 | Adjakple et al. |

FOREIGN PATENT DOCUMENTS

| | | |
|---|---|---|
| WO | WO-2019160973 A1 | 8/2019 |
| WO | WO-2019187423 A1 | 10/2019 |
| WO | WO-2021062400 A1 * | 4/2021 |

OTHER PUBLICATIONS

ZTE: "Initial Consideration on NR V2X Resource Allocation", 3GPP Draft, 3GPP TSG-RAN WG2#103bis, R2-1814168 Initial Consideration on NR V2X Resource Allocation, 3rd Generation Partnership Project (3GPP), Mobile Competence Centre, 650, Route Des Lucioles, F-06921, Sophia-Antipolis Cedex, vol. RAN WG2, Sep. 28, 2018 (Sep. 28, 2018), 7 pages, XP051523625, Retrieved from the Internet: URL: http://www.3gpp.org/ftp/tsg%5Fran/WG2%5FRL2/TSGR2%5F103bis/Docs/R2%2D1814168%2Ezip, [retrieved on Dec. 11, 2018], Sections 1-3.

Huawei, et al., "Sidelink Physical Layer Procedures for NR V2X", 3GPP TSG RAN WG1 Meeting #96, 3GPP Draft; R1-1901537, 3rd Generation Partnership Project (3GPP), Mobile Competence Centre; 650, Route Des Lucioles; F-06921 Sophia-Antipolis Cedex; France, Mar. 1, 2019 (Mar. 1, 2019), pp. 1-16, XP051599234, Retrieved from the Internet: URL: http://www.3gpp.orgjftpjtsg%5Fran/WG1%5FRL1/TSGR1%5F96/Docs/R1 %2D1901537%2Ezip pp. 1-13.

Huawei, et al., "Sidelink Resource Allocation Mechanism for NR V2X", 3GPP TSG RAN WG1 Meeting #94bis, 3GPP Draft; R1-1811904 Updated V1 Clean, 3rd Generation Partnership Project (3GPP), Mobile Competence Centre; 650, Route Des Lucioles; F-06921 Sophia-Antipolis Cedex; France vol. RAN WG1, No. Chengdu, China; Oct. 8, 2018-Oct. 12, 2018, Oct. 10, 2018 (Oct. 10, 2018), 13 Pages, XP051519227, Retrieved from the Internet: URL: http://www.3gpp.org/ftp/tsg%5Fran/WG1 %5FRL1/TSGR1%5F94b/Docs/R1%2D1811904%2Ezip, [retrieved on Oct. 10, 2018].

VIVO: "Enhancements of Uu Link to Control Sidelink", 3GPP Draft, 3GPP TSG RAN WG1 Meeting #95, R1-1812310, Enhancements of UU Link to Control Sidelink, 3rd Generation Partnership Project (3GPP), Mobile Competence Centre, 650, Route Des Lucioles, F-06921, Sophia-Antipolis Cedex, France, vol. RAN WG1, No. Spokane, USA; Nov. 12, 2018-Nov. 16, 2018, Nov. 3, 2018 (Nov. 3, 2018), XP051478499, 5 pages, Retrieved from the Internet: URL:http://www.3gpp.org/ftp/tsg%5Fran/WG1%5FRL1/TSGR1%5F95/Docs/R1%2D1812310%2Ezip [retrieved on Nov. 3, 2018] Section 2.

* cited by examiner

SIDELINK GROUPCAST SCHEDULING

CROSS REFERENCE

The present application for patent claims the benefit of U.S. Provisional Patent Application No. 62/925,706 by Ryu et al., entitled "SIDELINK GROUPCAST SCHEDULING," filed Oct. 24, 2019, assigned to the assignee hereof, and expressly incorporated by reference herein.

INTRODUCTION

The following relates generally to wireless communications and more specifically to managing sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of wireless communications at a first UE is described. The method may include transmitting, to a base station, a sidelink scheduling request for groupcast sidelink communications with a set of UEs, receiving, from the base station, a groupcast sidelink grant that indicates time-frequency resources for groupcast sidelink communications between the first UE and one or more UEs of the set of UEs, and receiving, in the groupcast sidelink grant, an subset identifier of the first UE, respective identifiers for each UE of the one or more UEs, one or more transmission beams for transmission of a groupcast sidelink message, or any combination thereof. The method may further include transmitting, via the time-frequency resources indicated by the groupcast sidelink grant, the groupcast sidelink message to the one or more UEs.

An apparatus for wireless communications at a first UE is described. The apparatus may include a processor, memory coupled to the processor, the processor and memory configured to transmit, to a base station, a sidelink scheduling request for groupcast sidelink communications with a set of UEs, receive, from the base station, a groupcast sidelink grant that indicates time-frequency resources for groupcast sidelink communications between the first UE and one or more UEs of the set of UEs, and receive, in the groupcast sidelink grant, an identifier of the first UE, respective identifiers for each UE of the one or more UEs, one or more transmission beams for transmission of a groupcast sidelink message, or any combination thereof. The processor and memory may further be configured to transmit, via the time-frequency resources indicated by the groupcast sidelink grant, the groupcast sidelink message to the one or more UEs.

Another apparatus for wireless communications at a first UE is described. The apparatus may include means for transmitting, to a base station, a sidelink scheduling request for groupcast sidelink communications with a set of UEs, receiving, from the base station, a groupcast sidelink grant that indicates time-frequency resources for groupcast sidelink communications between the first UE and one or more UEs of the set of UEs, and receiving, in the groupcast sidelink grant, an identifier of the first UE, respective identifiers for each UE of the one or more UEs, one or more transmission beams for transmission of a groupcast sidelink message, or any combination thereof. The apparatus may further include means for transmitting, via the time-frequency resources indicated by the groupcast sidelink grant, the groupcast sidelink message to the one or more UEs.

A non-transitory computer-readable medium storing code for wireless communications at a first UE is described. The code may include instructions executable by a processor to transmit, to a base station, a sidelink scheduling request for groupcast sidelink communications with a set of UEs, receive, from the base station, a groupcast sidelink grant that indicates time-frequency resources for groupcast sidelink communications between the first UE and one or more UEs of the set of UEs, and receive, in the groupcast sidelink grant, an identifier of the first UE, respective identifiers for each UE of the one or more UEs, one or more transmission beams for transmission of a groupcast sidelink message, or any combination thereof. The code may further include instructions executable by a processor to transmit, via the time-frequency resources indicated by the groupcast sidelink grant, the groupcast sidelink message to the one or more UEs.

Some examples of the method, apparatuses, and non-transitory computer-readable medium described herein may further include operations, features, means, or instructions for transmitting, in the sidelink scheduling request, a group identifier associated with the set of UEs and the first UE, the identifier of the first UE, one or more transmission beams for the groupcast sidelink message, respective identifiers for each UE of the set of UEs, an amount of data corresponding to the groupcast sidelink message, or any combination thereof.

In some examples of the method, apparatuses, and non-transitory computer-readable medium described herein, the one or more transmission beams may be a subset of a set of transmission beams included in the sidelink scheduling request.

Some examples of the method, apparatuses, and non-transitory computer-readable medium described herein may further include operations, features, means, or instructions for transmitting the sidelink scheduling request in a radio resource control (RRC) message, a medium access control (MAC) control element (MAC-CE), a scheduling request (SR), a buffer status report (BSR), or any combination thereof.

In some examples of the method, apparatuses, and non-transitory computer-readable medium described herein, the BSR indicates an amount of data remaining in a buffer of the first UE for transmission via a groupcast sidelink communication.

Some examples of the method, apparatuses, and non-transitory computer-readable medium described herein may further include operations, features, means, or instructions for receiving, independent of the sidelink scheduling request, an indication to transmit one or more groupcast sidelink messages based on a size of a groupcast buffer of the first UE.

In some examples of the method, apparatuses, and non-transitory computer-readable medium described herein, the size of the groupcast buffer of the first UE may be above a buffer threshold.

Some examples of the method, apparatuses, and non-transitory computer-readable medium described herein may further include operations, features, means, or instructions for receiving the groupcast sidelink grant in a RRC message, a MAC-CE, a downlink control information (DCI) transmission, or any combination thereof.

In some examples of the method, apparatuses, and non-transitory computer-readable medium described herein, the set of UEs may be a subgroup of a group of UEs including the first UE.

Some examples of the method, apparatuses, and non-transitory computer-readable medium described herein may further include operations, features, means, or instructions for determining the set of UEs based on a beam training procedure for groupcast sidelink communications.

Some examples of the method, apparatuses, and non-transitory computer-readable medium described herein may further include operations, features, means, or instructions for transmitting a request to perform a groupcast sidelink communication with a set of UEs supported by the base station, and receiving, in response to the request, an indication of the one or more UEs of the set of UEs.

A method of wireless communications at a first UE is described. The method may include transmitting, to a base station, a sidelink scheduling request for groupcast sidelink communications with a set of UEs, receiving, from the base station, a groupcast sidelink grant that indicates time-frequency resources for groupcast sidelink communications between the first UE and a plurality of UEs of the set of UEs, and transmitting, via the time-frequency resources indicated by the groupcast sidelink grant, a groupcast sidelink message to the plurality of UEs.

An apparatus for wireless communications at a first UE is described. The apparatus may include a processor, memory coupled to the processor, the processor and memory configured to transmit, to a base station, a sidelink scheduling request for groupcast sidelink communications with a set of UEs, receive, from the base station, a groupcast sidelink grant that indicates time-frequency resources for groupcast sidelink communications between the first UE and a plurality of UEs of the set of UEs, and transmit, via the time-frequency resources indicated by the groupcast sidelink grant, a groupcast sidelink message to the plurality of UEs.

Another apparatus for wireless communications at a first UE is described. The apparatus may include means for transmitting, to a base station, a sidelink scheduling request for groupcast sidelink communications with a set of UEs, receiving, from the base station, a groupcast sidelink grant that indicates time-frequency resources for groupcast sidelink communications between the first UE and a plurality of UEs of the set of UEs, and transmitting, via the time-frequency resources indicated by the groupcast sidelink grant, a groupcast sidelink message to the plurality of UEs.

A non-transitory computer-readable medium storing code for wireless communications at a first UE is described. The code may include instructions executable by a processor to transmit, to a base station, a sidelink scheduling request for groupcast sidelink communications with a set of UEs, receive, from the base station, a groupcast sidelink grant that indicates time-frequency resources for groupcast sidelink communications between the first UE and a plurality of UEs of the set of UEs, and transmit, via the time-frequency resources indicated by the groupcast sidelink grant, a groupcast sidelink message to the plurality of UEs.

Some examples of the method, apparatuses, and non-transitory computer-readable medium described herein may further include operations, features, means, or instructions for transmitting, in the sidelink scheduling request, a group identifier associated with the set of UEs and the first UE, an identifier of the first UE, one or more transmission beams for the groupcast sidelink message, respective identifiers for each UE of the set of UEs, an amount of data corresponding to the groupcast sidelink message, or any combination thereof.

Some examples of the method, apparatuses, and non-transitory computer-readable medium described herein may further include operations, features, means, or instructions for receiving, in the groupcast sidelink grant, an identifier of the first UE, respective identifiers for each UE of the plurality of UEs, one or more transmission beams for transmission of the groupcast sidelink message, or any combination thereof.

In some examples of the method, apparatuses, and non-transitory computer-readable medium described herein, the one or more transmission beams may be a subset of a set of transmission beams included in the sidelink scheduling request.

Some examples of the method, apparatuses, and non-transitory computer-readable medium described herein may further include operations, features, means, or instructions for transmitting the sidelink scheduling request in a RRC message, a MAC-CE, a SR, a BSR, or any combination thereof.

In some examples of the method, apparatuses, and non-transitory computer-readable medium described herein, the BSR indicates an amount of data remaining in a buffer of the first UE for transmission via a groupcast sidelink communication.

Some examples of the method, apparatuses, and non-transitory computer-readable medium described herein may further include operations, features, means, or instructions for receiving, independent of the sidelink scheduling request, an indication to transmit one or more groupcast sidelink messages based on a size of a groupcast buffer of the first UE.

In some examples of the method, apparatuses, and non-transitory computer-readable medium described herein, the size of the groupcast buffer of the first UE may be above a buffer threshold.

Some examples of the method, apparatuses, and non-transitory computer-readable medium described herein may further include operations, features, means, or instructions for receiving the groupcast sidelink grant in a RRC message, a MAC-CE, a DCI transmission, or any combination thereof.

In some examples of the method, apparatuses, and non-transitory computer-readable medium described herein, the set of UEs may be a subgroup of a group of UEs including the first UE.

Some examples of the method, apparatuses, and non-transitory computer-readable medium described herein may further include operations, features, means, or instructions for determining the set of UEs based on a beam training procedure for groupcast sidelink communications.

Some examples of the method, apparatuses, and non-transitory computer-readable medium described herein may further include operations, features, means, or instructions for transmitting a request to perform a groupcast sidelink communication with a set of UEs supported by the base station, and receiving, in response to the request, an indication of the plurality of UEs of the set of UEs.

A method of wireless communications at a base station is described. The method may include receiving, from a first UE of a group of UEs supported by the base station, a sidelink scheduling request for groupcast sidelink communications between the first UE and a set of UEs of the group of UEs, determining, based on the sidelink scheduling request, one or more UEs of the set of UEs and time-frequency resources for groupcast sidelink communications between the first UE and the one or more UEs, and transmitting, to the first UE, a groupcast sidelink grant that indicates the time-frequency resources for groupcast sidelink communications between the first UE and one or more UEs of the set of UEs. The method may further include transmitting, in the groupcast sidelink grant, an identifier of the first UE, respective identifiers for each UE of the one or more UEs, one or more transmission beams for transmission of a groupcast sidelink message, or any combination thereof.

An apparatus for wireless communications at a base station is described. The apparatus may include a processor, memory coupled to the processor, the processor and memory configured to receive, from a first UE of a group of UEs supported by the base station, a sidelink scheduling request for groupcast sidelink communications between the first UE and a set of UEs of the group of UEs, determine, based on the sidelink scheduling request, one or more UEs of the set of UEs and time-frequency resources for groupcast sidelink communications between the first UE and the one or more UEs, and transmit, to the first UE, a groupcast sidelink grant that indicates the time-frequency resources for groupcast sidelink communications between the first UE and one or more UEs of the set of UEs. The processor and memory may further be configured to transmit, in the groupcast sidelink grant, an identifier of the first UE, respective identifiers for each UE of the one or more UEs, one or more transmission beams for transmission of a groupcast sidelink message, or any combination thereof.

Another apparatus for wireless communications at a base station is described. The apparatus may include means for receiving, from a first UE of a group of UEs supported by the base station, a sidelink scheduling request for groupcast sidelink communications between the first UE and a set of UEs of the group of UEs, determining, based on the sidelink scheduling request, one or more UEs of the set of UEs and time-frequency resources for groupcast sidelink communications between the first UE and the one or more UEs, and transmitting, to the first UE, a groupcast sidelink grant that indicates the time-frequency resources for groupcast sidelink communications between the first UE and one or more UEs of the set of UEs. The apparatus may further include means for transmitting, in the groupcast sidelink grant, an identifier of the first UE, respective identifiers for each UE of the one or more UEs, one or more transmission beams for transmission of a groupcast sidelink message, or any combination thereof.

A non-transitory computer-readable medium storing code for wireless communications at a base station is described. The code may include instructions executable by a processor to receive, from a first UE of a group of UEs supported by the base station, a sidelink scheduling request for groupcast sidelink communications between the first UE and a set of UEs of the group of UEs, determine, based on the sidelink scheduling request, one or more UEs of the set of UEs and time-frequency resources for groupcast sidelink communications between the first UE and the one or more UEs, and transmit, to the first UE, a groupcast sidelink grant that indicates the time-frequency resources for groupcast sidelink communications between the first UE and one or more UEs of the set of UEs. The code may further include instructions executable to transmit, in the groupcast sidelink grant, an identifier of the first UE, respective identifiers for each UE of the one or more UEs, one or more transmission beams for transmission of a groupcast sidelink message, or any combination thereof.

Some examples of the method, apparatuses, and non-transitory computer-readable medium described herein may further include operations, features, means, or instructions for receiving, in the sidelink scheduling request, a group identifier associated with the group of UEs, the identifier of the first UE, one or more transmission beams for the groupcast sidelink message, respective identifiers for each UE of the set of UEs, an amount of data corresponding to the groupcast sidelink message for transmission by the first UE, or any combination thereof.

Some examples of the method, apparatuses, and non-transitory computer-readable medium described herein may further include operations, features, means, or instructions for identifying a set of transmission beams included in the sidelink scheduling request, and determining the one or more transmission beams for transmission of the groupcast sidelink message, where the one or more transmission beams may be a subset of the set of transmission beams.

Some examples of the method, apparatuses, and non-transitory computer-readable medium described herein may further include operations, features, means, or instructions for transmitting the groupcast sidelink grant to each of the one or more UEs.

Some examples of the method, apparatuses, and non-transitory computer-readable medium described herein may further include operations, features, means, or instructions for receiving the sidelink scheduling request in a RRC message, a MAC-CE, a SR, a BSR, or any combination thereof.

In some examples of the method, apparatuses, and non-transitory computer-readable medium described herein, the BSR indicates an amount of data remaining in a buffer of the first UE for transmission via a groupcast sidelink communication.

Some examples of the method, apparatuses, and non-transitory computer-readable medium described herein may further include operations, features, means, or instructions for transmitting, independent of the sidelink scheduling request, an indication for the first UE to transmit one or more groupcast sidelink messages based on a size of a groupcast buffer of the first UE.

In some examples of the method, apparatuses, and non-transitory computer-readable medium described herein, the size of the groupcast buffer of the first UE may be above a buffer threshold.

Some examples of the method, apparatuses, and non-transitory computer-readable medium described herein may further include operations, features, means, or instructions for transmitting the groupcast sidelink grant in a RRC message, a MAC-CE, a DCI transmission, or any combination thereof.

Some examples of the method, apparatuses, and non-transitory computer-readable medium described herein may further include operations, features, means, or instructions for determining a transmission configuration for groupcast sidelink communications between the first UE and the one or more UEs of the set of UEs, where the transmission configuration indicates multiple transmission beams for the first UE, a modulation coding scheme (MCS), a transmission configuration indicator (TCI), or any combination thereof.

Some examples of the method, apparatuses, and non-transitory computer-readable medium described herein may further include operations, features, means, or instructions for receiving a request for a groupcast sidelink communication to a set of UEs supported by the base station, determining the one or more UEs of the set of UEs based on the request, and transmitting, in response to the request, an indication of the one or more UEs for groupcast sidelink communications.

A method of wireless communications at a base station is described. The method may include receiving, from a first UE of a group of UEs supported by the base station, a sidelink scheduling request for groupcast sidelink communications between the first UE and a set of UEs of the group of UEs, determining, based on the sidelink scheduling request, a plurality of UEs of the set of UEs and time-frequency resources for groupcast sidelink communications between the first UE and the plurality of UEs, and transmitting, to the first UE, a groupcast sidelink grant that indicates the time-frequency resources for groupcast sidelink communications between the first UE and the plurality of UEs of the set of UEs.

An apparatus for wireless communications at a base station is described. The apparatus may include a processor, memory coupled to the processor, the processor and memory configured to receive, from a first UE of a group of UEs supported by the base station, a sidelink scheduling request for groupcast sidelink communications between the first UE and a set of UEs of the group of UEs, determine, based on the sidelink scheduling request, a plurality UEs of the set of UEs and time-frequency resources for groupcast sidelink communications between the first UE and the plurality of UEs, and transmit, to the first UE, a groupcast sidelink grant that indicates the time-frequency resources for groupcast sidelink communications between the first UE and the plurality of UEs of the set of UEs.

Another apparatus for wireless communications at a base station is described. The apparatus may include means for receiving, from a first UE of a group of UEs supported by the base station, a sidelink scheduling request for groupcast sidelink communications between the first UE and a set of UEs of the group of UEs, determining, based on the sidelink scheduling request, a plurality of UEs of the set of UEs and time-frequency resources for groupcast sidelink communications between the first UE and the plurality of UEs, and transmitting, to the first UE, a groupcast sidelink grant that indicates the time-frequency resources for groupcast sidelink communications between the first UE and the plurality of UEs of the set of UEs.

A non-transitory computer-readable medium storing code for wireless communications at a base station is described. The code may include instructions executable by a processor to receive, from a first UE of a group of UEs supported by the base station, a sidelink scheduling request for groupcast sidelink communications between the first UE and a set of UEs of the group of UEs, determine, based on the sidelink scheduling request, a plurality of UEs of the set of UEs and time-frequency resources for groupcast sidelink communications between the first UE and the plurality of UEs, and transmit, to the first UE, a groupcast sidelink grant that indicates the time-frequency resources for groupcast sidelink communications between the first UE and the plurality of UEs of the set of UEs.

Some examples of the method, apparatuses, and non-transitory computer-readable medium described herein may further include operations, features, means, or instructions for receiving, in the sidelink scheduling request, a group identifier associated with the group of UEs, an identifier of the first UE, one or more transmission beams for a groupcast sidelink message, respective identifiers for each UE of the set of UEs, an amount of data corresponding to the groupcast sidelink message for transmission by the first UE, or any combination thereof.

Some examples of the method, apparatuses, and non-transitory computer-readable medium described herein may further include operations, features, means, or instructions for transmitting, in the groupcast sidelink grant, an identifier of the first UE, respective identifiers for each UE of the plurality of UEs, one or more transmission beams for transmission of the groupcast sidelink message, or any combination thereof.

Some examples of the method, apparatuses, and non-transitory computer-readable medium described herein may further include operations, features, means, or instructions for identifying a set of transmission beams included in the sidelink scheduling request, and determining the one or more transmission beams for transmission of the groupcast sidelink message, where the one or more transmission beams may be a subset of the set of transmission beams.

Some examples of the method, apparatuses, and non-transitory computer-readable medium described herein may further include operations, features, means, or instructions for transmitting the groupcast sidelink grant to each of the plurality of UEs.

Some examples of the method, apparatuses, and non-transitory computer-readable medium described herein may further include operations, features, means, or instructions for receiving the sidelink scheduling request in a RRC message, a MAC-CE, a SR, a BSR, or any combination thereof.

In some examples of the method, apparatuses, and non-transitory computer-readable medium described herein, the BSR indicates an amount of data remaining in a buffer of the first UE for transmission via a groupcast sidelink communication.

Some examples of the method, apparatuses, and non-transitory computer-readable medium described herein may further include operations, features, means, or instructions for transmitting, independent of the sidelink scheduling request, an indication for the first UE to transmit one or more groupcast sidelink messages based on a size of a groupcast buffer of the first UE.

In some examples of the method, apparatuses, and non-transitory computer-readable medium described herein, the size of the groupcast buffer of the first UE may be above a buffer threshold.

Some examples of the method, apparatuses, and non-transitory computer-readable medium described herein may further include operations, features, means, or instructions for transmitting the groupcast sidelink grant in a RRC message, a MAC-CE, a DCI transmission, or any combination thereof.

Some examples of the method, apparatuses, and non-transitory computer-readable medium described herein may further include operations, features, means, or instructions for determining a transmission configuration for groupcast sidelink communications between the first UE and the plurality of UEs of the set of UEs, where the transmission configuration indicates multiple transmission beams for the first UE, a MCS, a TCI, or any combination thereof.

Some examples of the method, apparatuses, and non-transitory computer-readable medium described herein may further include operations, features, means, or instructions for receiving a request for a groupcast sidelink communication to a set of UEs supported by the base station, determining the plurality of UEs of the set of UEs based on the request, and transmitting, in response to the request, an indication of the plurality UEs for groupcast sidelink communications.

A method of wireless communications at a first UE is described. The method may include establishing a connection with a base station that supports communications for a group of UEs including the first UE, receiving, from the base station, a groupcast sidelink grant that indicates time-frequency resources for groupcast sidelink communications between one or more UEs including the first UE and a second UE of the group of UEs, and receiving, in the groupcast sidelink grant, respective identifiers of the first UE and the one or more UEs, the second UE, one or more reception beams for reception of a groupcast sidelink message, or any combination thereof. The method may further include monitoring the time-frequency resources for a groupcast sidelink communication from the second UE.

An apparatus for wireless communications at a first UE is described. The apparatus may include a processor, memory coupled to the processor, the processor and memory configured to establish a connection with a base station that supports communications for a group of UEs including the first UE, receive, from the base station, a groupcast sidelink grant that indicates time-frequency resources for groupcast sidelink communications between one or more UEs including the first UE and a second UE of the group of UEs, and receive, in the groupcast sidelink grant, respective identifiers of the first UE and the one or more UEs, the second UE, one or more reception beams for reception of a groupcast sidelink message, or any combination thereof. The processor and memory may further be configured to monitor the time-frequency resources for a groupcast sidelink communication from the second UE.

Another apparatus for wireless communications at a first UE is described. The apparatus may include means for establishing a connection with a base station that supports communications for a group of UEs including the first UE, receiving, from the base station, a groupcast sidelink grant that indicates time-frequency resources for groupcast sidelink communications between one or more UEs including the first UE and a second UE of the group of UEs, and receiving, in the groupcast sidelink grant, respective identifiers of the first UE and the one or more UEs, the second UE, one or more reception beams for reception of a groupcast sidelink message, or any combination thereof. The apparatus may further include means for monitoring the time-frequency resources for a groupcast sidelink communication from the second UE.

A non-transitory computer-readable medium storing code for wireless communications at a first UE is described. The code may include instructions executable by a processor to establish a connection with a base station that supports communications for a group of UEs including the first UE, receive, from the base station, a groupcast sidelink grant that indicates time-frequency resources for groupcast sidelink communications between one or more UEs including the first UE and a second UE of the group of UEs, and receive, in the groupcast sidelink grant, respective identifiers of the first UE and the one or more UEs, the second UE, one or more reception beams for reception of a groupcast sidelink message, or any combination thereof. The code may further include instructions executable by the processor to monitor the time-frequency resources for a groupcast sidelink communication from the second UE.

Some examples of the method, apparatuses, and non-transitory computer-readable medium described herein may further include operations, features, means, or instructions for identifying a receive beam for receiving the groupcast sidelink communication based on the groupcast sidelink grant, and monitoring the time-frequency resources using the receive beam.

Some examples of the method, apparatuses, and non-transitory computer-readable medium described herein may further include operations, features, means, or instructions for receiving the groupcast sidelink grant in a groupcast transmission or a dedicated transmission from the base station.

Some examples of the method, apparatuses, and non-transitory computer-readable medium described herein may further include operations, features, means, or instructions for receiving the groupcast sidelink grant in an RRC message, a MAC-CE, a DCI transmission, or any combination thereof.

A method of wireless communications at a first UE is described. The method may include establishing a connection with a base station that supports communications for a group of UEs including the first UE, receiving, from the base station, a groupcast sidelink grant that indicates time-frequency resources for groupcast sidelink communications between a plurality of UEs including the first UE and a second UE of the group of UEs, and monitoring the time-frequency resources for a groupcast sidelink communication from the second UE.

An apparatus for wireless communications at a first UE is described. The apparatus may include a processor, memory coupled to the processor, the processor and memory configured to establish a connection with a base station that supports communications for a group of UEs including the first UE, receive, from the base station, a groupcast sidelink grant that indicates time-frequency resources for groupcast sidelink communications between a plurality of UEs including the first UE and a second UE of the group of UEs, and monitor the time-frequency resources for a groupcast sidelink communication from the second UE.

Another apparatus for wireless communications at a first UE is described. The apparatus may include means for establishing a connection with a base station that supports communications for a group of UEs including the first UE, receiving, from the base station, a groupcast sidelink grant that indicates time-frequency resources for groupcast sidelink communications between a plurality of UEs including the first UE and a second UE of the group of UEs, and monitoring the time-frequency resources for a groupcast sidelink communication from the second UE.

A non-transitory computer-readable medium storing code for wireless communications at a first UE is described. The code may include instructions executable by a processor to establish a connection with a base station that supports communications for a group of UEs including the first UE, receive, from the base station, a groupcast sidelink grant that indicates time-frequency resources for groupcast sidelink communications between the plurality of UEs including the first UE and a second UE of the group of UEs, and monitor the time-frequency resources for a groupcast sidelink communication from the second UE.

Some examples of the method, apparatuses, and non-transitory computer-readable medium described herein may further include operations, features, means, or instructions for identifying a receive beam for receiving the groupcast sidelink communication based on the groupcast sidelink grant, and monitoring the time-frequency resources using the receive beam.

Some examples of the method, apparatuses, and non-transitory computer-readable medium described herein may further include operations, features, means, or instructions for receiving, in the groupcast sidelink grant, respective identifiers of the first UE and the plurality of UEs, the second UE, one or more transmission beams for transmission of the groupcast sidelink message, or any combination thereof.

Some examples of the method, apparatuses, and non-transitory computer-readable medium described herein may further include operations, features, means, or instructions for receiving the groupcast sidelink grant in a groupcast transmission or a dedicated transmission from the base station.

Some examples of the method, apparatuses, and non-transitory computer-readable medium described herein may further include operations, features, means, or instructions for receiving the groupcast sidelink grant in a RRC message, a MAC-CE, a DCI transmission, or any combination thereof.

DETAILED DESCRIPTION

Figure 1:
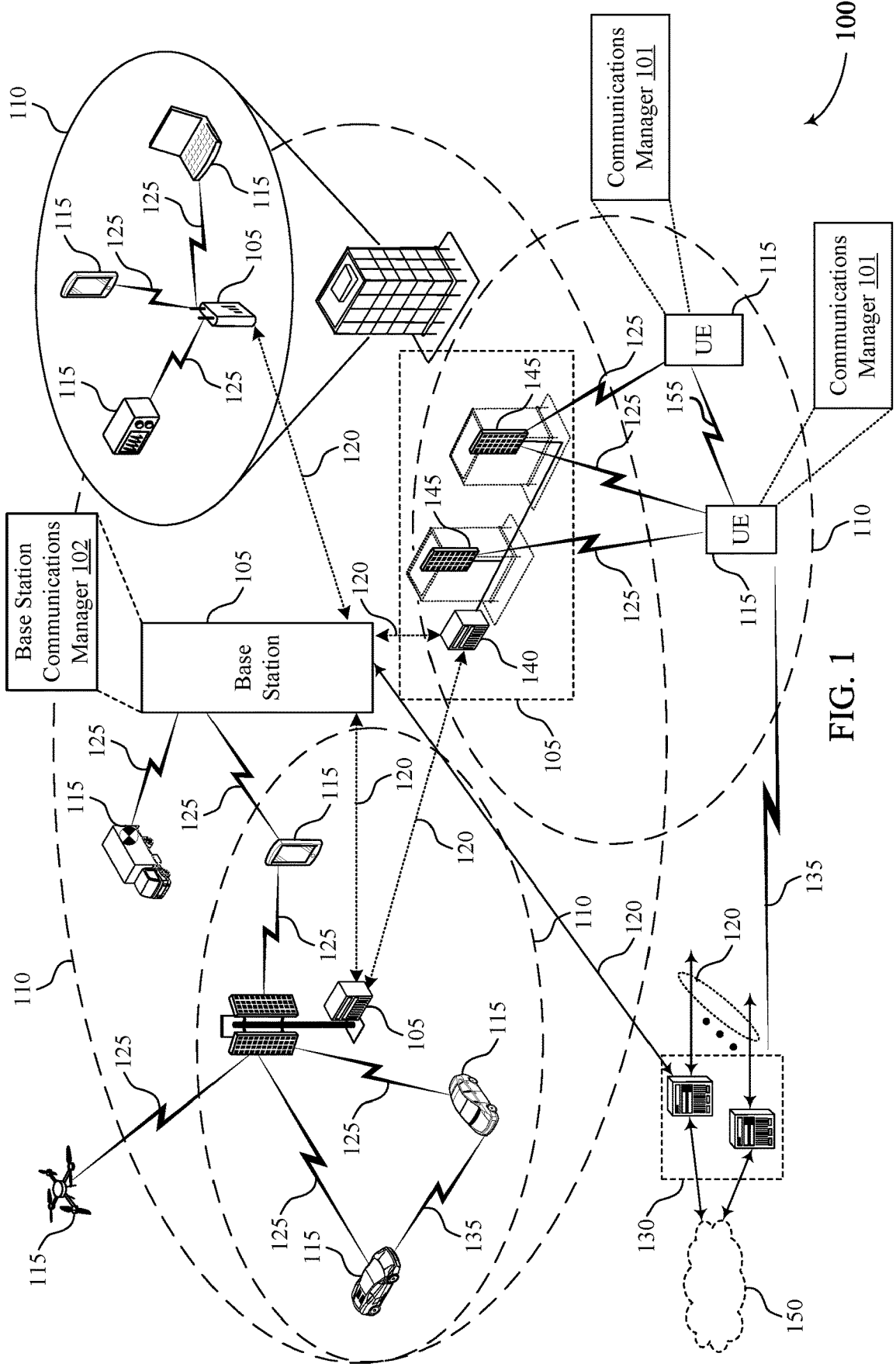
FIG. 1 illustrates an example of a wireless communications system that supports sidelink groupcast scheduling in accordance with one or more aspects of the present disclosure.

A wireless communications system may support both access links and sidelinks for communications between wireless devices. An access link may refer to a communication link between a UE and a base station. For example, an access link may support uplink signaling, downlink signaling, connection procedures, etc. One or more UEs connected to a base station over access links may derive timing from the base station. A UE may also be an example of an integrated access and backhaul (IAB) node. A sidelink may refer to any communication link between similar wireless devices (e.g., a communication link between UEs, a backhaul communication link between base stations, etc.). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one wireless device to one or more other wireless devices.

As demand for sidelink communication increases, (e.g., due to increased V2X demand for autonomous and semi-autonomous vehicles, D2D communication between Internet-of-Things (IoT) devices, factory automation etc.), techniques to efficiently and reliably enhance throughput and reliability of sidelink channels is desirable. In some cases, sidelink groupcast communications may be desired, in which one transmitting device may transmit signals to multiple other devices (e.g., a vehicle that transmits sensor data to multiple other vehicles via sidelink communications). Further, coordination of resources used for sidelink and techniques to decrease number of sidelink retransmissions and improve efficiency at transmitting and receiving UEs.

In some cases, a UE may transmit a groupcast message to multiple other UEs over a sidelink communication link. To transmit the groupcast message, the resource pool of the transmitting UE may need to align with the resource pool of the receiving UEs. In order to reliably receive the groupcast message, the receiving UEs may receive an indication of which UE is transmitting, so that the receiving UEs may configure their receive beams to receive from the transmitting UE (i.e., point the receive beam to the transmitting UE). The transmitting UE may determine to transmit the groupcast message based on receiving an indication of which UEs may receive the message. For example, if no UEs are able to receive the message, the transmitting UE may determine not to transmit the groupcast message.

The resource pool alignment may be coordinated by a base station during access link communications, but the resource pool may be aligned without base station assistance for sidelink communications. UEs communicating over sidelink may use base station assistance to coordinate sidelink communications (e.g., including unicast communication resources and groupcast communication resources), as the UEs communicating over sidelink may also communicate over the access link with a base station. Groupcast communication resources may also include or be an example of broadcast or multicast communications.

A UE that transmits groupcast sidelink communications to other UEs may transmit a sidelink transmit request to a base station. The UE may transmit the sidelink transmit request to the base station over an access link.

The base station may receive the request from the UE, and may transmit a sidelink transmit and receive scheduling grant. The sidelink scheduling grant may be transmitted to the transmitting UE (e.g., the UE that transmitted the sidelink transmit request) and the receiving UEs. The sidelink scheduling grant may specify which UE is transmitting the groupcast sidelink communication, such that receiving UEs may determine which receive beams to use, and how to configure the corresponding receive beams. The sidelink scheduling grant may also indicate which UEs will receive, and which transmit beam the transmitting UE may use to transmit to the receiving UEs, as well as what resources to use (e.g., frequency resources and time resources).

The transmitting UE may receive the transmit and receive scheduling grant from the base station. Based on the sidelink scheduling grant, the designated receiving UEs may configure receive beams in order to receive the groupcast sidelink transmission from the transmitting UE. The transmitting UE may configure transmit beams based on the information in the sidelink scheduling grant. The transmitting UE may transmit the groupcast sidelink message to the receiving UEs.

Aspects of the disclosure are initially described in the context of wireless communications systems. Aspects of the disclosure are further described in the context of process flow diagrams. Aspects of the disclosure are further illustrated by and described with reference to apparatus diagrams, system diagrams, and flowcharts that relate to sidelink groupcast scheduling.

FIG. 1 illustrates an example of a wireless communications system 100 that supports sidelink groupcast scheduling in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the EHF band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A first use UE 115 may transmit, to a base station 105, a sidelink scheduling request for groupcast sidelink communications with a set of one or more UEs 115. The base station 105 may determine one or more UEs 115 of the set of UEs 115 and time-frequency resources for groupcast sidelink communication between the first UE 115 and the one or more UEs 115 of the set of UEs 115. The first UE 115 may receive, from the base station 105, a groupcast sidelink grant that indicates time-frequency resources for groupcast sidelink communications between the first UE 115 and one or more UEs 115. The first UE 115 may transmit, via the time-frequency resources indicated by the groupcast sidelink grant, a groupcast sidelink message to the one or more UEs 115. The one or more UEs 115 may also receive the sidelink grant, and may monitor the time-frequency resources for a groupcast sidelink communication from the first UE 115. In some examples, the UEs 115 may receive sidelink communications via a sidelink communication link 155.

UEs 115 may include a UE communications manager 101, which may transmit a sidelink scheduling request to base station 105, receive a groupcast sidelink grant, and transmit a groupcast sidelink message. A UE communications manager may also monitor for a groupcast sidelink communication from another UE 115.

One or more of base stations 105 may include a base station communications manager 102, which may receive a sidelink scheduling request, determine a set of UEs 115 and time-frequency resources, and transmit a groupcast sidelink grant to one or more UEs 115.

Figure 2:
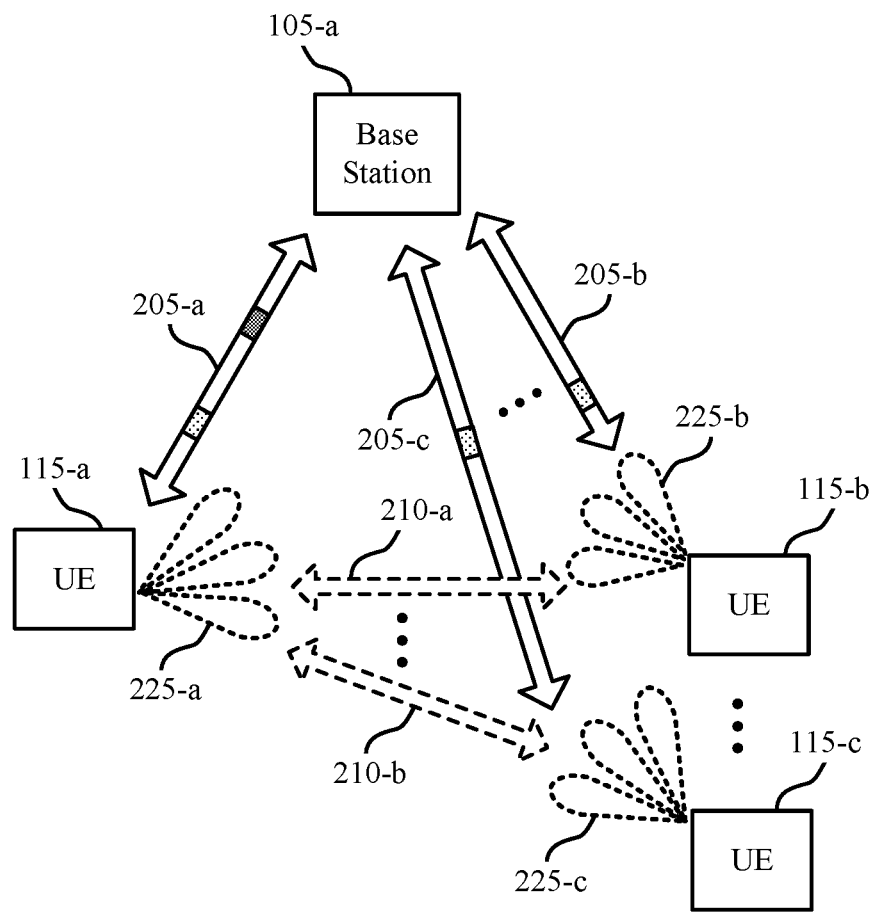
FIG. 2 illustrates an example of a wireless communications system that supports sidelink groupcast scheduling in accordance with one or more aspects of the present disclosure.

FIG. 2 illustrates an example of a wireless communications system 200 that supports sidelink groupcast scheduling in accordance with one or more aspects of the present disclosure. In some examples, wireless communication system 200 may implement aspects of wireless communication system 100. In some examples, the wireless communications system 200 may include a first UE 115-a, a second UE 115-b, a third UE 115-c, and base station 105-a which may be examples of UEs 115 and base stations 105 described with reference to FIG. 1. One or more of the UEs 115 may communicate with the base station 105 using a corresponding access link 205. In this example, the base station 105-a may communicate with the first UE 115-a via access link 205-a, may communicate with the second UE 115-b via access link 205-b, and may communicate with the third UE 115-c via access link 205-c.

In this example, the first UE 115-a, second UE 115-b, and third UE 115-c may be members of a sidelink groupcast communications group, in which members of the group may communicate with other members of the group to provide data or other information via sidelinks 210. For example, the first UE 115-a may communicate with the second UE 115-b via sidelink 210-a, and the first UE 115-a may communicate with the third UE 115-c via sidelink 210-b. The first UE 115-a may communicate with UEs 115-b and 115-c over sidelinks 210-a and 210-b by transmitting broadcast sidelink communications. In some examples, the first UE 115-a, the second UE 115-b, and the third UE 115-c may communicate using sets of one or more transmit beams 225-a or receive beams 225-b and 225-c, respectively.

In some cases, an applications layer at the first UE 115-a may prompt the creation of the sidelink groupcast communications group, and the group may be established through communications with the applications layer of other UEs 115 in the group. It is noted that the illustrated sidelink groupcast communications group provide communications between three UEs 115, which are illustrated in wireless communications system 200 for the sake of brevity, and the techniques described below may be applicable to other numbers of UEs 115 within a system that may establish a groupcast communications group. Further, sidelink communication techniques may be used for device-to-device communication of wireless devices other than UEs, such as base station communications (e.g., wireless backhaul links between base stations or transmit-receive points (TRPs), etc.), communications between access points, and the like.

In some cases, such as platooning where a group of vehicles travel together in a convoy, an application layer protocol (e.g., a V2X application layer) may form the sidelink groupcast communications group, and negotiation may happen between UE 115 members of the group. A group leader (e.g., first UE 115-a), such as a platoon leader in a platooning application, in some cases, may transmit a sidelink request 215 to the base station 105-a associated with operation of the sidelink groupcast communications of the group. For example, the first UE 115-a may transmit a scheduling request to the base station 105-a. Responsive to the sidelink request 215, the base station 105-a may transmit a sidelink grant 220 to UEs 115 of the group. The sidelink grant 220 may provide information related to sidelink groupcast communications, such as a grant of resources for sidelink transmissions.

The sidelink request 215 may contain a group identification (ID) information, an ID of UE 115-a that will transmit the groupcast sidelink transmission, an indication of transmit beams 225-a and corresponding IDs of receiving UEs 115-b and 115-c, and an indication of the data to be transmitted. The indication of the transmit beams 225-a may indicate one or more transmit beams 225-a that UE 115-a may use for transmitting to UEs 115-b and 115-c. The IDs of the receiving UEs 115 may in some cases be IDs distinct to each UE 115, in cases where UE 115-a is aware of the specific UEs 115 that UE 115-a intends to reach with the transmission of the groupcast sidelink message. In other cases, the IDs of the receiving UEs may include an indication of UE capabilities, such as collision warning capabilities of the UEs 115, or radar capabilities. In these cases, base station 105-a may determine which UEs 115 satisfy the capabilities, and base station 105-a may include an indication of the receiving UEs 115 in sidelink grant 220.

UE 115-a may transmit sidelink request 215 to base station 105-a in the form of RRC messaging, MAC-CE messaging, scheduling request messaging, BSR messaging, or a combination of these. In some cases, sidelink grant 220 may be transmitted to UEs 115 individually (i.e., in a unicast message). In other cases, sidelink grant 220 may be transmitted to UEs 115 in a groupcast message by base station 105-a. Base station 105-a may transmit sidelink grant 220 in the form of RRC messaging, MAC-CE messaging, or DCI messaging.

Sidelink grant 220 may indicate to UEs 115-*b* and 115-*c* in the group that they are to receive groupcast sidelink communications from UE 115-*a*. UEs 115-*b* and 115-*c* may then determine beams 225 or resources to use based on the sidelink grant 220.

In some cases, base station 105-*b* may limit the receive beams 225-*b* and 225-*c* corresponding to receiving UEs 115-*b* and 115-*c*, respectively, or the transmit beams 225-*a* corresponding to transmitting UE 115-*a*. Base station 105-*b* may limit the beams 225 by indicating, in the sidelink grant 220, transmit and receive beams 225 for UEs 115 to use. In some cases, UE 115-*a* may determine to transmit the groupcast message based on knowing which UEs 115 may receive the message. Thus, if no UEs 115 are able to receive the message, UE 115-*a* may determine not to transmit the groupcast message. UE 115-*a* may determine not to transmit the groupcast message based on signaling from base station 105-*a*, such as an indication in sidelink grant 220.

UE 115-*a* may explicitly request to base station 105-*a* which other UEs 115 are to receive the sidelink communications. In some cases, UE 115-*a* may indicate that a sub-group of UEs 115 of a group of UEs 115 are to receive the groupcast sidelink communications. For example, UE 115-*a* may retransmit the same data on different transmit beams 225-*a* to reach UEs 115 (e.g., UE 115-*b* and 115-*c*) located in different directions from UE 115-*a*. Thus, UE 115-*a* may indicate receiving UEs 115 to the base station in order to reduce the number of data retransmissions on different transmit beams 225-*a*.

For example, in order to reach particular UEs 115 of a group of UEs 115 (e.g., a sub-group), the transmission configuration (e.g., beams 225, time resources, frequency resources) may need to be altered. UE 115-*a* may be aware of the need to alter the transmission configuration based on beam training that has previously been performed by the transmitting and receiving UEs 115. Thus, UE 115-*a* may in this case indicate, in sidelink request 215, which UEs 115 are to receive the groupcast sidelink communications, in order to avoid altering the transmission configuration to reach particular UEs 115. Base station 105-*a* may grant sidelink groupcast transmission resources such that UE 115-*a* transmits the groupcast sidelink transmission to a sub-group of the group of UEs 115. Thus, UE 115-*a* may receive beams 225 and resource configurations in sidelink grant 220 which may enable UE 115-*a* to efficiently transmit to the requested sub-group of UEs 115. UE 115-*a* may thus reduce the number of repetitions and retransmissions of groupcast sidelink communications by transmitting to a sub-group of UEs 115.

Base station 105-*a* may grant sidelink groupcast transmission resources for transmission to a subgroup of UEs 115 in order to decrease interference with another sidelink transmission that may be scheduled at the same time or frequency. In some cases, base station 105-*a* and UE 115-*a* may negotiate the selection of the receiving UEs 115 prior to UE 115-*a* transmitting sidelink request 215, or during the transmission by base station 105-*a* of the sidelink grant 220. For example, base station 105-*a* may send the sidelink grant 220 to UE 115-*a* and the sub-group of receiving UEs (e.g., UE 115-*b* and 115-*c*) with particular resource allocations based on information base station 105-*a* has about potential interference.

In cases where UE 115-*a* transmits the sidelink transmission request in a BSR, UE 115-*a* may indicate to the base station the amount of data that is in the UE 115-*a* queue (i.e., buffer) that will be transmitted in the groupcast message over sidelink 210 to other UEs 115. The BSR may implicitly trigger base station 105-*a* to transmit sidelink grant 220 to the group of UEs 115 (including transmitting UE 115-*a* and receiving UEs 115-*b* and 115-*c*) over access links 205.

In cases where UE 115-*a* transmits a sidelink request 215 in the form of a BSR, base station 105-*a* may transmit sidelink grant 220 to indicate to UE 115-*a* to transmit buffer components on sidelinks 210. In some cases, base station 105-*a* may receive multiple sidelink request 215 from multiple UEs 115. In these cases, base station 105-*a* may determine which UE 115 may transmit on the sidelink based on which UE 115 reports the highest buffer size. Base station 105-*a* may determine priority of sidelink transmissions based on buffer size, communication type, communication priority level, and other parameters.

Figure 3:
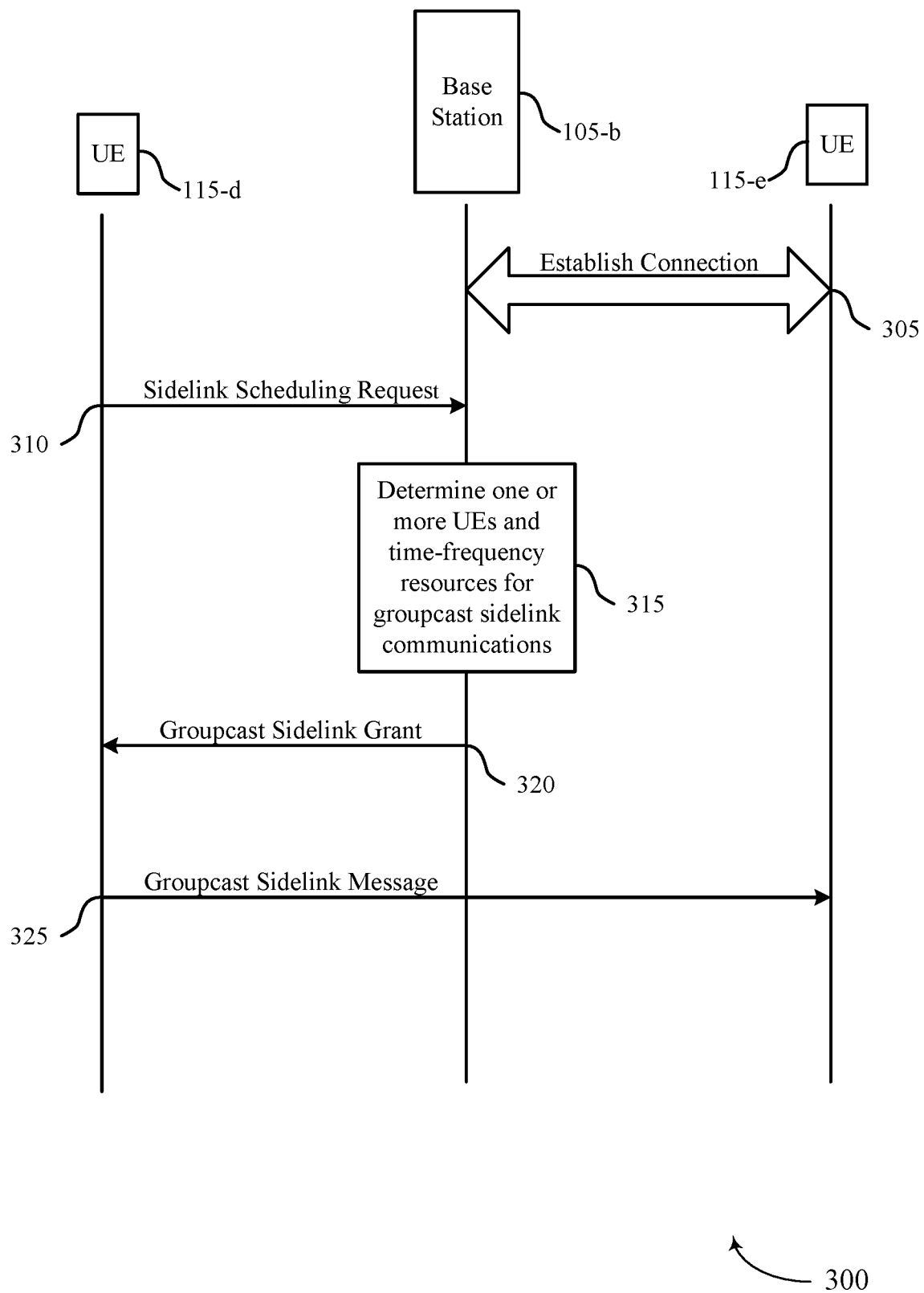
FIG. 3 illustrates an example of a process flow that supports sidelink groupcast scheduling in accordance with one or more aspects of the present disclosure.

FIG. 3 illustrates an example of a process flow 300 that supports sidelink groupcast scheduling in accordance with one or more aspects of the present disclosure. In some examples, process flow 300 may implement aspects of wireless communication systems 100 and 200. Process flow 300 includes UE 115-*d* and UE 115-*e*, which may be examples of UEs 115 as described with respect to FIGS. 1 and 2. Process flow 300 also includes base station 105-*b* which may be an example of base stations 105 as described with respect to FIGS. 1 and 2. Base station 105-*b* may communicate with UEs 115-*d* and 115-*e* over access links, and UEs 115-*d* and 115-*e* may communicate over sidelink communication channels.

At 305, UE 115-*e* may establish a connection with base station 105-*b*. Base station 105-*b* may support communications for a group of UEs 115 including UE 115-*e*. At 310, UE 115-*d* may transmit, to base station 105-*b*, a sidelink scheduling request for groupcast sidelink communications with a set of UEs 115 (e.g., including UE 115-*e*). UE 115-*d* may determine the set of UEs 115 based on a beam training procedure for groupcast sidelink communications. In some cases, the set of UEs 115 may be a subgroup of a larger group of UEs 115 including UE 115-*d*. UE 115-*d* may transmit the sidelink scheduling request in a RRC message, a MAC-CE message, a SR, a BSR, or a combination of these.

UE 115-*d* may transmit, in the sidelink scheduling request, a group ID associated with the set of UEs 115 and UE 115-*d*, an ID of UE 115-*d*, one or more transmission beams for the groupcast sidelink message, respective IDs for each UE 115 of the set of UEs 115, an amount of data corresponding to the groupcast sidelink message, or a combination of these.

In cases where the sidelink scheduling is transmitted in a BSR, the BSR may indicate an amount of data remaining in a buffer of UE 115-*d* for transmission via a groupcast sidelink communication.

In some cases, independent of the sidelink scheduling request, UE 115-*d* may receive an indication to transmit on or more groupcast sidelink messages based on a seize of a groupcast buffer of UE 115-*d*. In these cases, the size of the groupcast buffer of UE 115-*d* may satisfy a threshold buffer size (e.g., above the threshold buffer size).

In some cases, UE 115-*d* may transmit a request to perform a groupcast sidelink communication with a set of UEs 115 supported by base station 105-*b*. UE 115-*d* may receive, in response to the request, an indication of the one or more UEs 115 of the set of UEs. This transmission of the request to perform a groupcast sidelink communication may occur before UE 115-*d* transmits the sidelink scheduling request to base station 105-*b*.

At 315, base station 105-*b* may determine, based on the sidelink scheduling request, one or more UEs 115 of the set of UEs 115, and time-frequency resources for groupcast sidelink communications between UE 115-*d* and the one or more UEs 115 (e.g., including UE 115-*e*).

Base station 105-*b* may identify a set of transmission beams included in the sidelink scheduling request. Base station 105-*b* may determine the one or more transmission beams for transmission of the groupcast sidelink message. The one or more transmission beams may be a subset of the set of transmission beams.

Base station 105-*b* may determine a transmission configuration for groupcast sidelink communications between UE 115-*d* and one or more UEs 115 of the set of UEs 115. The transmission configuration may indicate multiple transmission beams for UE 115-*d*, a MCS, a TCI, or a combination of these.

At 320, base station 105-*b* may transmit, to UE 115-*d*, a groupcast sidelink grant that indicates the time-frequency resources for groupcast sidelink communication between UE 115-*d* and one or more UEs 115 of a set of UEs 115 (e.g., including UE 115-*e*). Base station 105-*b* may transmit the groupcast sidelink grant to each UE 115 of the one or more UEs 115 (e.g., including UE 115-*d* and UE 115-*e*). UE 115-*e* may receive, from base station 105-*b*, a groupcast sidelink grant that indicates time-frequency resources for groupcast sidelink communications between one or more UEs 115, including UE 115-*d* and UE 115-*e*. UE 115-*e* may receive the groupcast sidelink grant in a groupcast transmission or a dedicated (e.g., unicast) transmission form base station 105-*b*.

UE 115-*d* may receive, from base station 105-*b*, a groupcast sidelink grant that indicates time-frequency resources for groupcast sidelink communications between UE 115-*d* and one or more UEs 115 of the set of UEs 115 (e.g., including UE 115-*e*). UE 115-*d* may receive, in the groupcast sidelink grant, an ID of UE 115-*d*, respective IDs for each UE 115 of the set of UEs 115, one or more transmission beams for transmission of the groupcast sidelink message, or a combination of these. The one or more transmission beams may be a subset of a set of transmission beams included in the sidelink scheduling request. Base station 105-*b* may transmit the groupcast sidelink grant in a RRC message, a MAC-CE message, a DCI transmission, or a combination of these.

UE 115-*e* may receive, in the groupcast sidelink rant, respective identifies of UE 115-*e* and the one or more UEs 115, UE 115-*d*, one or more transmission beams for transmission of the groupcast sidelink message, or a combination of these.

At 325, UE 115-*d* may transmit, via the time-frequency resources indicated by the groupcast sidelink grant, a groupcast sidelink message to the one or more UEs 115, including UE 115-*e*. UE 115-*e* may monitor the time-frequency resources for a groupcast sidelink communication from UE 115-*d*.

UE 115-*e* may determine a receive beam for receiving the groupcast sidelink communication based on the groupcast sidelink grant. UE 115-*e* may monitor the time-frequency resources using the receive beam.

Figure 4:
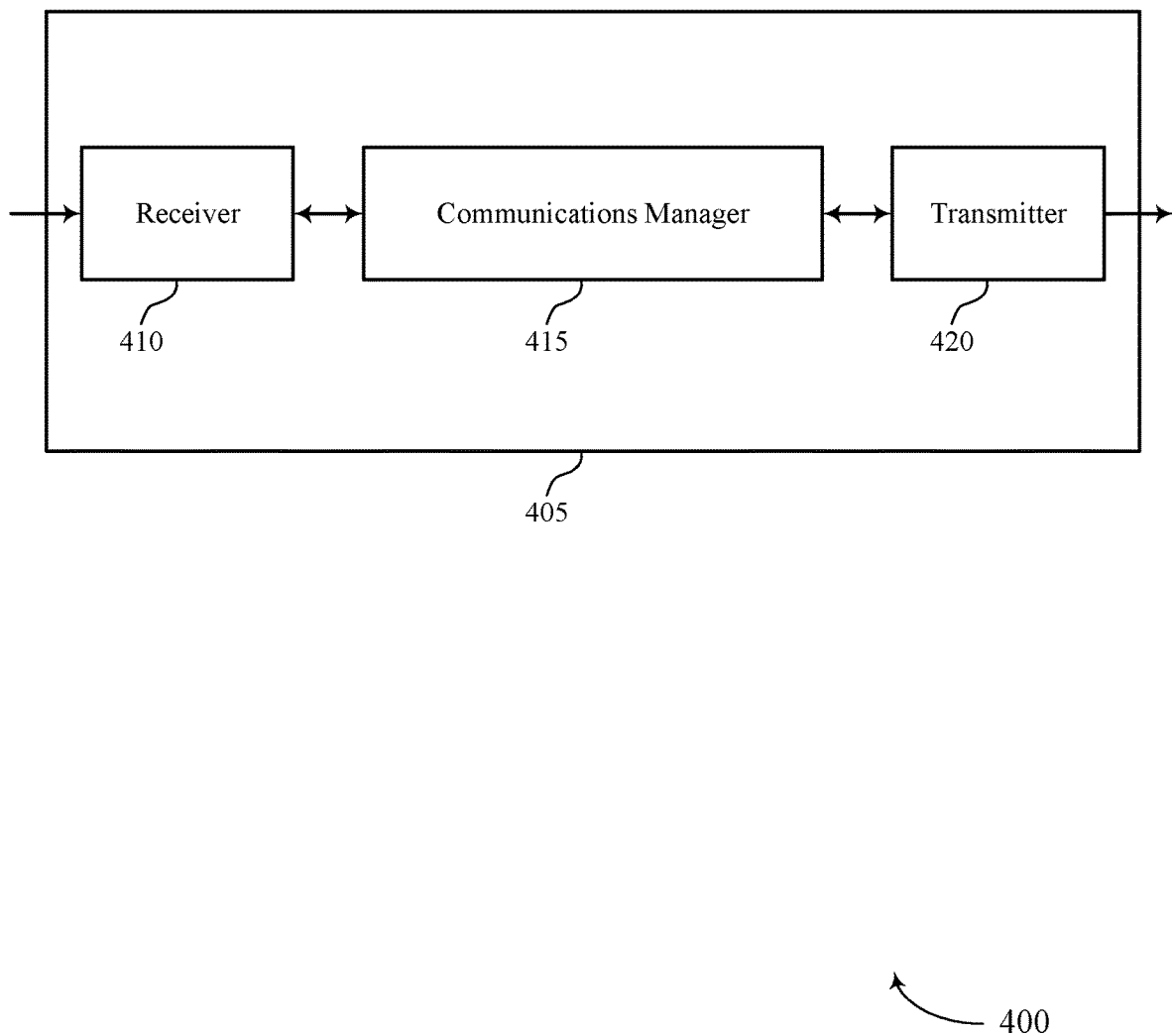
FIGS. 4 and 5 show block diagrams of devices that support sidelink groupcast scheduling in accordance with one or more aspects of the present disclosure.

FIG. 4 shows a block diagram 400 of a device 405 that supports sidelink groupcast scheduling in accordance with one or more aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to sidelink groupcast scheduling, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit, to a base station, a sidelink scheduling request for groupcast sidelink communications with a set of UEs, receive, from the base station, a groupcast sidelink grant that indicates time-frequency resources for groupcast sidelink communications between the first UE and one or more UEs of the set of UEs, and transmit, via the time-frequency resources indicated by the groupcast sidelink grant, a groupcast sidelink message to the one or more UEs. The communications manager 415 may also establish a connection with a base station that supports communications for a group of UEs including the first UE, receive, from the base station, a groupcast sidelink grant that indicates time-frequency resources for groupcast sidelink communications between one or more UEs including the first UE and a second UE of the group of UEs, and monitor the time-frequency resources for a groupcast sidelink communication from the second UE. The communications manager 415 may be an example of aspects of the communications manager 710 described herein.

The communications manager 415 may be an example of means for performing various aspects of managing sidelink communications as described herein. The communications manager 415, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 415, or its sub-components, may be implemented in code (e.g., as communications management software or firmware) executed by a processor, or any combination thereof. If implemented in code executed by a processor, the functions of the communications manager 415, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

In some examples, the communication manager 415 may be configured to perform various operations (e.g., receiving, determining, transmitting) using or otherwise in cooperation with the receiver 410, the transmitter 420, or both.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with one or more aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with one or more aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 described herein may be implemented as a chipset of a wireless modem, and the receiver 410 and the transmitter 420 may be implemented as sets of analog components (e.g., amplifiers, filters, phase shifters, antennas, etc.) The wireless modem may obtain and decode signals from the receiver 410 over a receive interface, and may output signals for transmission to the transmitter 420 over a transmit interface.

The actions performed by the communications manager 415 as described herein may be implemented to realize one or more potential advantages. One implementation may allow the device 405 (e.g., a UE 115) to save power and increase battery life by avoiding unnecessary retransmissions through groupcast coordination with a base station 105. Additionally or alternatively, time and frequency resources may be used more efficiently through coordination with a base station 105. In one example, the communications manager 415 may increase the amount of data transmitted by the transmitter 420 through efficient use of resources. Another implementation may provide improved quality and reliability of service at the device 405 by diversifying the types of communications transmitted and received by the communications manager 415.

By coordinating with a base station 105 to efficiently determine resource allocation, a processor of the device 405 (e.g., a processor controlling the receiver 410, the communications manager 415, the transmitter 420, etc.) may reduce processing resources used for communications. For example, by scheduling sidelink transmissions based on an indication received from a base station 105, the processor may efficiently select resources for the transmissions. Additionally or alternatively, by selecting resources based on the coordination with the base station 105, the number of times that the processor ramps up processing power and turns on processing units may be reduced.

Figure 5:
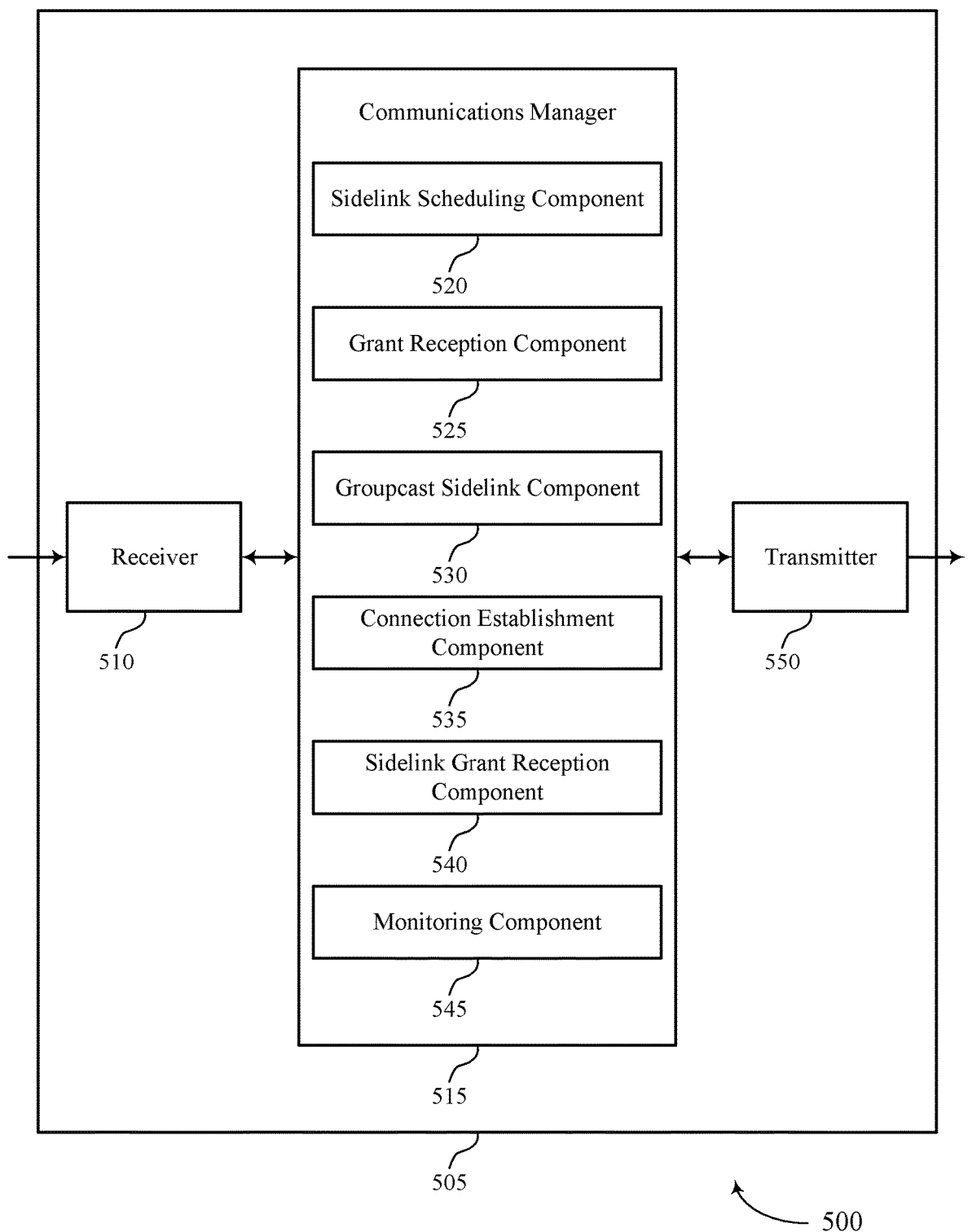

FIG. 5 shows a block diagram 500 of a device 505 that supports sidelink groupcast scheduling in accordance with one or more aspects of the present disclosure. The device 505 may be an example of aspects of a device 405, or a UE 115 as described herein. The device 505 may include a receiver 510, a communications manager 515, and a transmitter 550. The device 505 may also include a processor. Each of these components may be in communication with one another (e.g., via one or more buses).

The receiver 510 may receive information such as packets, user data, or control information associated with various information channels (e.g., control channels, data channels, and information related to sidelink groupcast scheduling, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a sidelink scheduling component 520, a grant reception component 525, a groupcast sidelink component 530, a connection establishment component 535, a sidelink grant reception component 540, and a monitoring component 545. The communications manager 515 may be an example of aspects of the communications manager 710 described herein.

The sidelink scheduling component 520 may transmit, to a base station, a sidelink scheduling request for groupcast sidelink communications with a set of UEs.

The grant reception component 525 may receive, from the base station, a groupcast sidelink grant that indicates time-frequency resources for groupcast sidelink communications between the first UE and one or more UEs of the set of UEs.

The groupcast sidelink component 530 may transmit, via the time-frequency resources indicated by the groupcast sidelink grant, a groupcast sidelink message to the one or more UEs. The connection establishment component 535 may establish a connection with a base station that supports communications for a group of UEs including the first UE.

The sidelink grant reception component 540 may receive, from the base station, a groupcast sidelink grant that indicates time-frequency resources for groupcast sidelink communications between one or more UEs including the first UE and a second UE of the group of UEs. The monitoring component 545 may monitor the time-frequency resources for a groupcast sidelink communication from the second UE.

The transmitter 550 may transmit signals generated by other components of the device 505. In some examples, the transmitter 550 may be collocated with a receiver 510 in a transceiver module. For example, the transmitter 550 may be an example of aspects of the transceiver 720 described with reference to FIG. 7. The transmitter 550 may utilize a single antenna or a set of antennas.

A processor of a UE 115 (e.g., controlling the receiver 510, the transmitter 550, or the transceiver 720 as described with reference to FIG. 7) may efficiently operate components of a UE 115 to improve quality of service and communication reliability at the UE 115. The processor of the UE 115 may operate the transmitter 550 to transmit sidelink request grants to a base station 105, which may improve coordination of sidelink communications and decrease the number of retransmissions needed to successfully transmit sidelink unicast or groupcast messaging. The processor may also efficiently operate the receiver 510 to receive sidelink grants from a base station 105, which may further improve coordination of sidelink communications to and from a UE 115.

Figure 6:
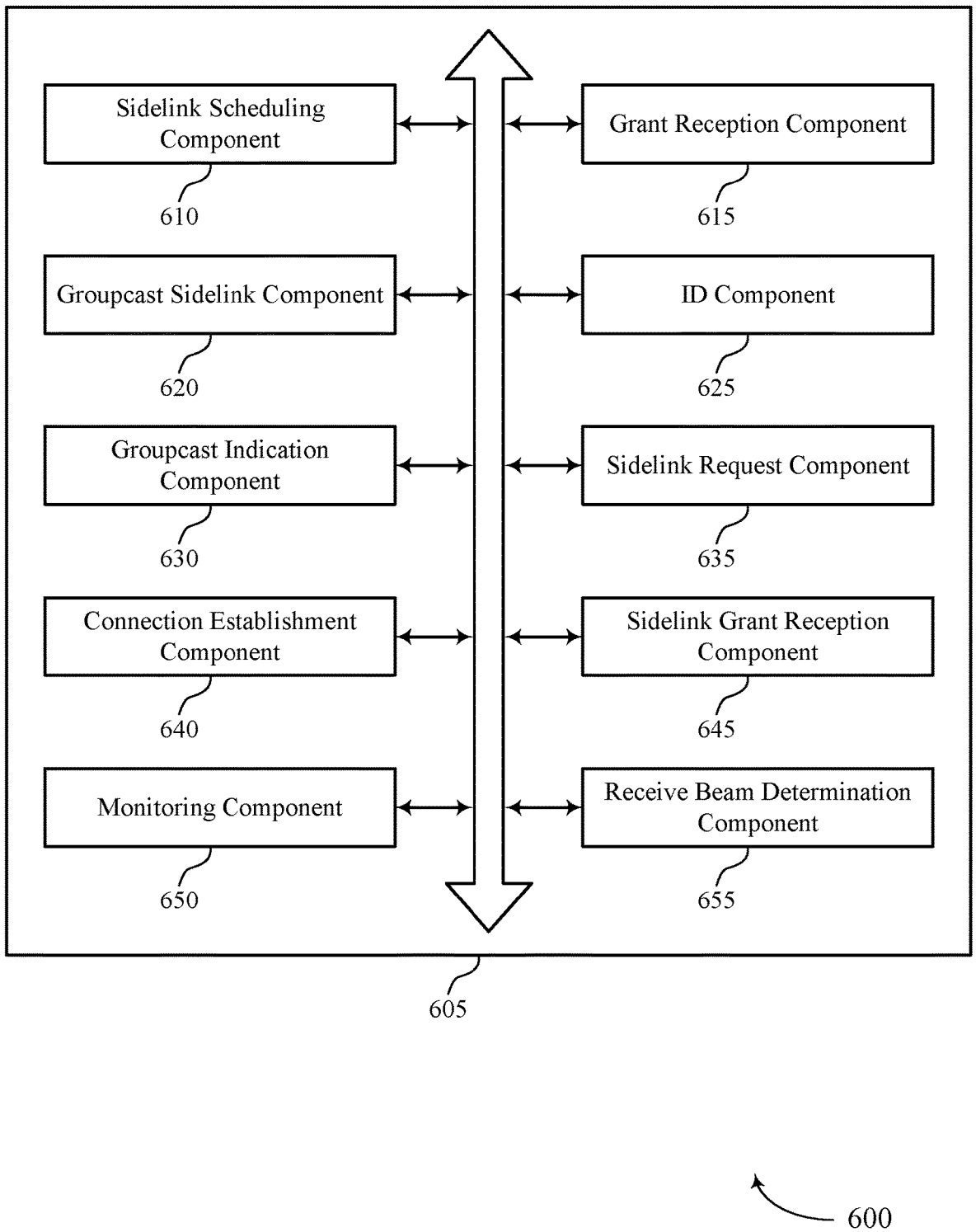
FIG. 6 shows a block diagram of a communications manager that supports sidelink groupcast scheduling in accordance with one or more aspects of the present disclosure.

FIG. 6 shows a block diagram 600 of a communications manager 605 that supports sidelink groupcast scheduling in accordance with one or more aspects of the present disclosure. The communications manager 605 may be an example of aspects of a communications manager 415, a communications manager 515, or a communications manager 710 described herein. The communications manager 605 may include a sidelink scheduling component 610, a grant reception component 615, a groupcast sidelink component 620, an ID component 625, a groupcast indication component 630, a sidelink request component 635, a connection establishment component 640, a sidelink grant reception component 645, a monitoring component 650, and a receive beam determination component 655. Each of these modules may communicate, directly or indirectly, with one another (e.g., via one or more buses).

The sidelink scheduling component 610 may transmit, to a base station, a sidelink scheduling request for groupcast sidelink communications with a set of UEs.

In some examples, the sidelink scheduling component 610 may transmit the sidelink scheduling request in a RRC message, a MAC-CE, a SR, a BSR, or any combination thereof. In some cases, the BSR indicates an amount of data remaining in a buffer of the first UE for transmission via a groupcast sidelink communication.

In some examples, the sidelink scheduling component 610 may determine the set of UEs based on a beam training procedure for groupcast sidelink communications. In some cases, the set of UEs is a subgroup of a group of UEs including the first UE.

The grant reception component 615 may receive, from the base station, a groupcast sidelink grant that indicates time-frequency resources for groupcast sidelink communications between the first UE and one or more UEs of the set of UEs.

In some examples, the grant reception component 615 may receive the groupcast sidelink grant in a RRC message, a MAC-CE, a DCI transmission, or any combination thereof.

The groupcast sidelink component 620 may transmit, via the time-frequency resources indicated by the groupcast sidelink grant, a groupcast sidelink message to the one or more UEs.

The connection establishment component 640 may establish a connection with a base station that supports communications for a group of UEs including the first UE.

The sidelink grant reception component 645 may receive, from the base station, a groupcast sidelink grant that indicates time-frequency resources for groupcast sidelink communications between one or more UEs including the first UE and a second UE of the group of UEs.

In some examples, the sidelink grant reception component 645 may receive, in the groupcast sidelink grant, respective identifiers of the first UE and the one or more UEs, the second UE, one or more transmission beams for transmission of the groupcast sidelink message, or any combination thereof.

In some examples, the sidelink grant reception component 645 may receive the groupcast sidelink grant in a groupcast transmission or a dedicated transmission from the base station.

In some examples, the sidelink grant reception component 645 may receive the groupcast sidelink grant in a RRC message, a MAC-CE, a DCI transmission, or any combination thereof.

The monitoring component 650 may monitor the time-frequency resources for a groupcast sidelink communication from the second UE. In some examples, the monitoring component 650 may monitor the time-frequency resources using the receive beam.

The ID component 625 may transmit, in the sidelink scheduling request, a group identifier associated with the set of UEs and the first UE, an identifier of the first UE, one or more transmission beams for the groupcast sidelink message, respective identifiers for each UE of the set of UEs, an amount of data corresponding to the groupcast sidelink message, or any combination thereof. In some examples, the ID component 625 may receive, in the groupcast sidelink grant, an identifier of the first UE, respective identifiers for each UE of the one or more UEs, one or more transmission beams for transmission of the groupcast sidelink message, or any combination thereof. In some cases, the one or more transmission beams are a subset of a set of transmission beams included in the sidelink scheduling request.

The groupcast indication component 630 may receive, independent of the sidelink scheduling request, an indication to transmit one or more groupcast sidelink messages based on a size of a groupcast buffer of the first UE. In some cases, the size of the groupcast buffer of the first UE is above a buffer threshold.

The sidelink request component 635 may transmit a request to perform a groupcast sidelink communication with a set of UEs supported by the base station. In some examples, the sidelink request component 635 may receive, in response to the request, an indication of the one or more UEs of the set of UEs.

The receive beam determination component 655 may determine a receive beam for receiving the groupcast sidelink communication based on the groupcast sidelink grant.

Figure 7:
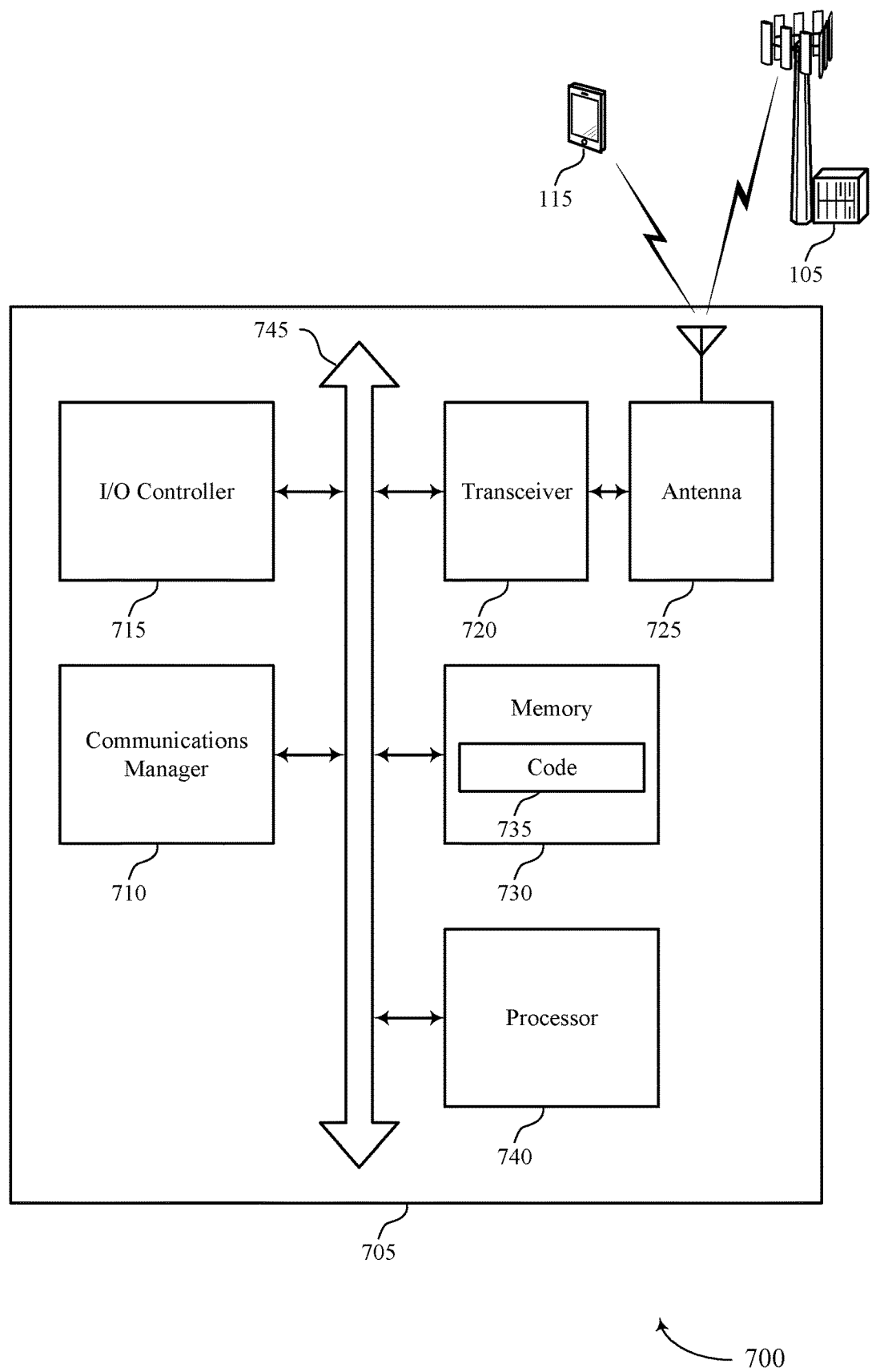
FIG. 7 shows a diagram of a system including a device that supports sidelink groupcast scheduling in accordance with one or more aspects of the present disclosure.

FIG. 7 shows a diagram of a system 700 including a device 705 that supports sidelink groupcast scheduling in accordance with one or more aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit, to a base station, a sidelink scheduling request for groupcast sidelink communications with a set of UEs, receive, from the base station, a groupcast sidelink grant that indicates time-frequency resources for groupcast sidelink communications between the first UE and one or more UEs of the set of UEs, and transmit, via the time-frequency resources indicated by the groupcast sidelink grant, a groupcast sidelink message to the one or more UEs. The communications manager 710 may also establish a connection with a base station that supports communications for a group of UEs including the first UE, receive, from the base station, a groupcast sidelink grant that indicates time-frequency resources for groupcast sidelink communications between one or more UEs including the first UE and a second UE of the group of UEs, and monitor the time-frequency resources for a groupcast sidelink communication from the second UE.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting sidelink groupcast scheduling).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
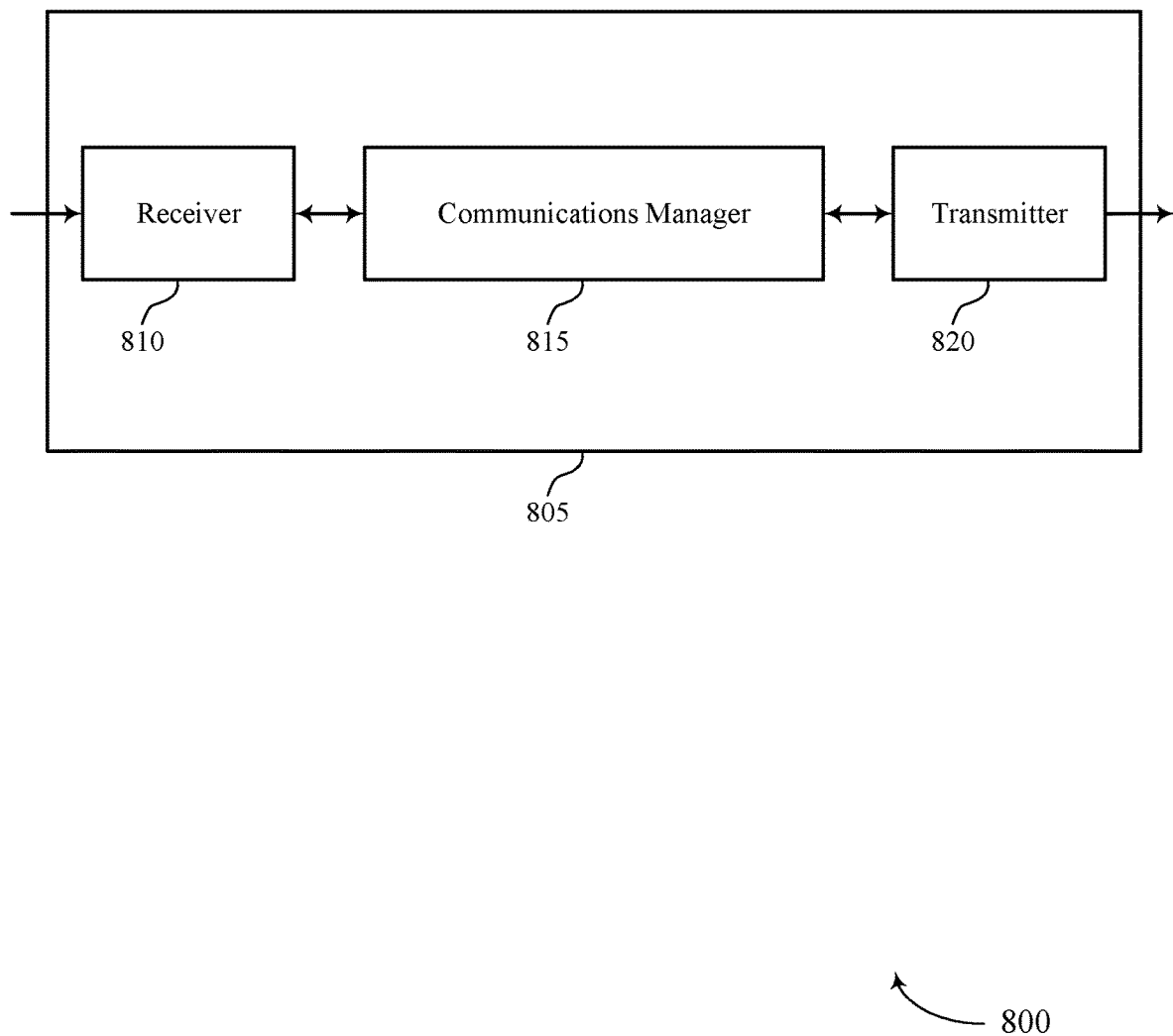
FIGS. 8 and 9 show block diagrams of devices that support sidelink groupcast scheduling in accordance with one or more aspects of the present disclosure.

FIG. 8 shows a block diagram 800 of a device 805 that supports sidelink groupcast scheduling in accordance with one or more aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to sidelink groupcast scheduling, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a first UE of a group of UEs supported by the base station, a sidelink scheduling request for groupcast sidelink communications between the first UE and a set of UEs of the group of UEs, determine, based on the sidelink scheduling request, one or more UEs of the set of UEs and time-frequency resources for groupcast sidelink communications between the first UE and the one or more UEs, and transmit, to the first UE, a groupcast sidelink grant that indicates the time-frequency resources for groupcast sidelink communications between the first UE and one or more UEs of the set of UEs. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with one or more aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with one or more aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
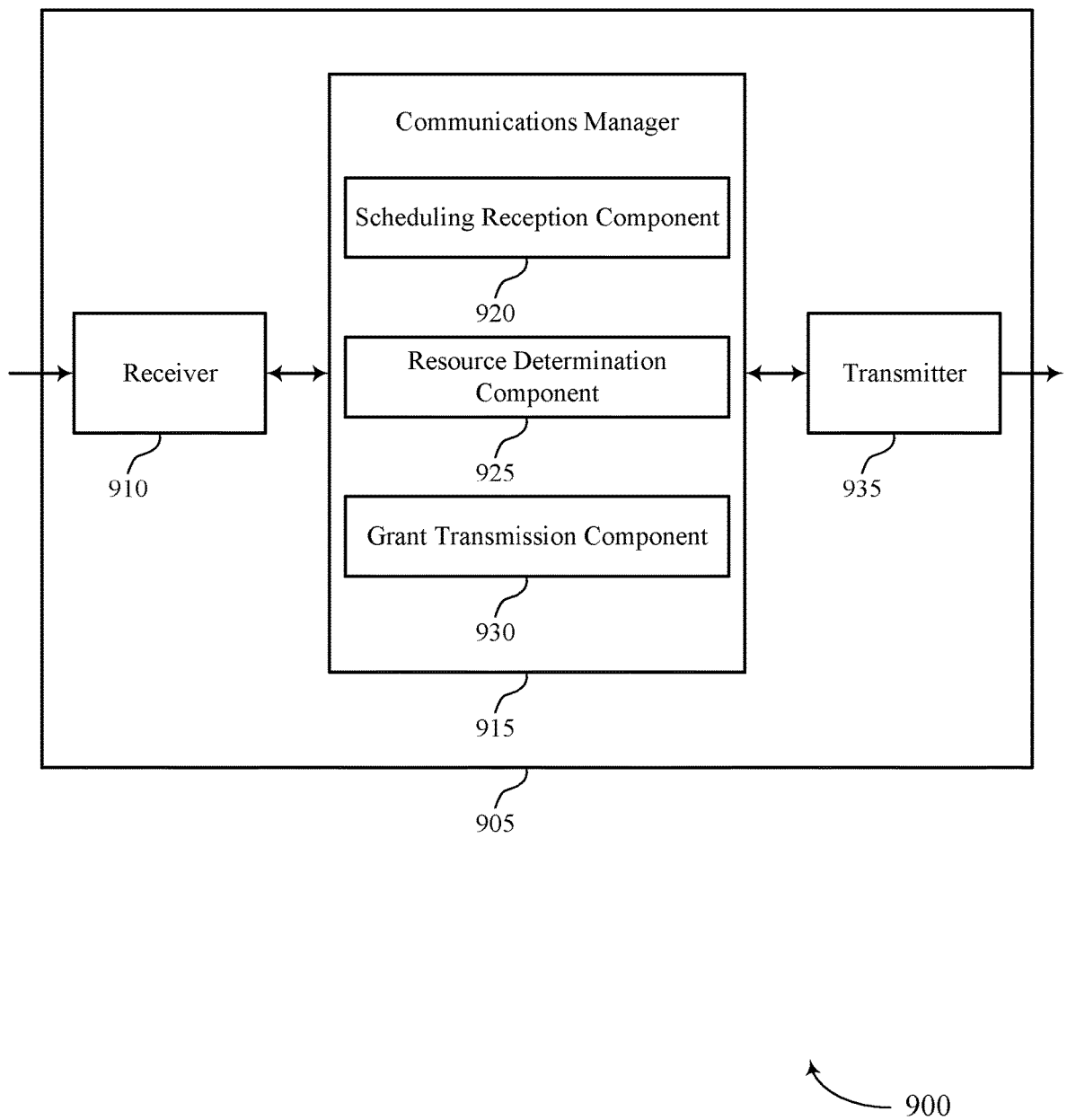

FIG. 9 shows a block diagram 900 of a device 905 that supports sidelink groupcast scheduling in accordance with one or more aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to sidelink groupcast scheduling, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a scheduling reception component 920, a resource determination component 925, and a grant transmission component 930. The communications manager 915 may be an example of aspects of the communications manager 1110 described herein.

The scheduling reception component 920 may receive, from a first UE of a group of UEs supported by the base station, a sidelink scheduling request for groupcast sidelink communications between the first UE and a set of UEs of the group of UEs.

The resource determination component 925 may determine, based on the sidelink scheduling request, one or more UEs of the set of UEs and time-frequency resources for groupcast sidelink communications between the first UE and the one or more UEs.

The grant transmission component 930 may transmit, to the first UE, a groupcast sidelink grant that indicates the time-frequency resources for groupcast sidelink communications between the first UE and one or more UEs of the set of UEs.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
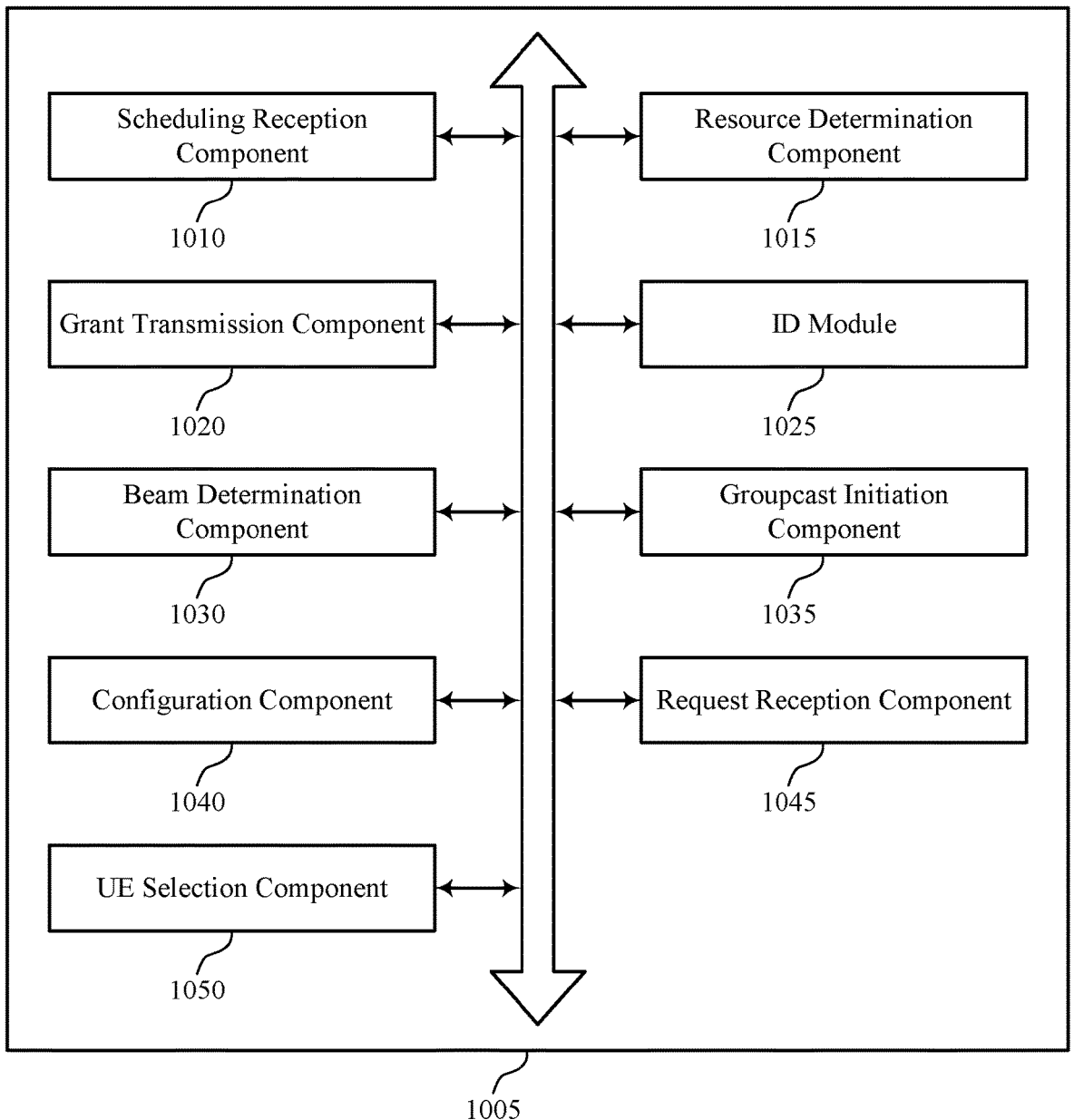
FIG. 10 shows a block diagram of a communications manager that supports sidelink groupcast scheduling in accordance with one or more aspects of the present disclosure.

FIG. 10 shows a block diagram 1000 of a communications manager 1005 that supports sidelink groupcast scheduling in accordance with one or more aspects of the present disclosure. The communications manager 1005 may be an example of aspects of a communications manager 815, a communications manager 915, or a communications manager 1110 described herein. The communications manager 1005 may include a scheduling reception component 1010, a resource determination component 1015, a grant transmission component 1020, an ID module 1025, a beam determination component 1030, a groupcast initiation component 1035, a configuration component 1040, a request reception component 1045, and a UE selection component 1050. Each of these modules may communicate, directly or indirectly, with one another (e.g., via one or more buses).

The scheduling reception component 1010 may receive, from a first UE of a group of UEs supported by the base station, a sidelink scheduling request for groupcast sidelink communications between the first UE and a set of UEs of the group of UEs. In some examples, the scheduling reception component 1010 may receive the sidelink scheduling request in a RRC message, a MAC-CE, a SR, a BSR, or any combination thereof. In some cases, the BSR indicates an amount of data remaining in a buffer of the first UE for transmission via a groupcast sidelink communication.

The resource determination component 1015 may determine, based on the sidelink scheduling request, one or more UEs of the set of UEs and time-frequency resources for groupcast sidelink communications between the first UE and the one or more UEs.

The grant transmission component 1020 may transmit, to the first UE, a groupcast sidelink grant that indicates the time-frequency resources for groupcast sidelink communications between the first UE and one or more UEs of the set of UEs. In some examples, the grant transmission component 1020 may transmit the groupcast sidelink grant to each of the one or more UEs. In some examples, the grant transmission component 1020 may transmit the groupcast sidelink grant in a RRC message, a MAC-CE, a DCI transmission, or any combination thereof.

The ID module 1025 may receive, in the sidelink scheduling request, a group identifier associated with the group of UEs, an identifier of the first UE, one or more transmission beams for the groupcast sidelink message, respective identifiers for each UE of the set of UEs, an amount of data corresponding to a groupcast sidelink message for transmission by the first UE, or any combination thereof. In some examples, the ID module 1025 may transmit, in the groupcast sidelink grant, an identifier of the first UE, respective identifiers for each UE of the one or more UEs, one or more transmission beams for transmission of the groupcast sidelink message, or any combination thereof.

The beam determination component 1030 may identify a set of transmission beams included in the sidelink scheduling request. In some examples, the beam determination component 1030 may determine the one or more transmission beams for transmission of the groupcast sidelink message, where the one or more transmission beams are a subset of the set of transmission beams.

The groupcast initiation component 1035 may transmit, independent of the sidelink scheduling request, an indication for the first UE to transmit one or more groupcast sidelink messages based on a size of a groupcast buffer of the first UE. In some cases, the size of the groupcast buffer of the first UE is above a buffer threshold.

The configuration component 1040 may determine a transmission configuration for groupcast sidelink communications between the first UE and one or more UEs of the set of UEs, where the transmission configuration indicates multiple transmission beams for the first UE, a MCS, a TCI, or any combination thereof.

The request reception component 1045 may receive a request for a groupcast sidelink communication to a set of UEs supported by the base station. The UE selection component 1050 may determine the one or more UEs of the set of UEs based on the request. In some examples, the UE selection component 1050 may transmit, in response to the request, an indication of the one or more UEs for groupcast sidelink communications.

Figure 11:
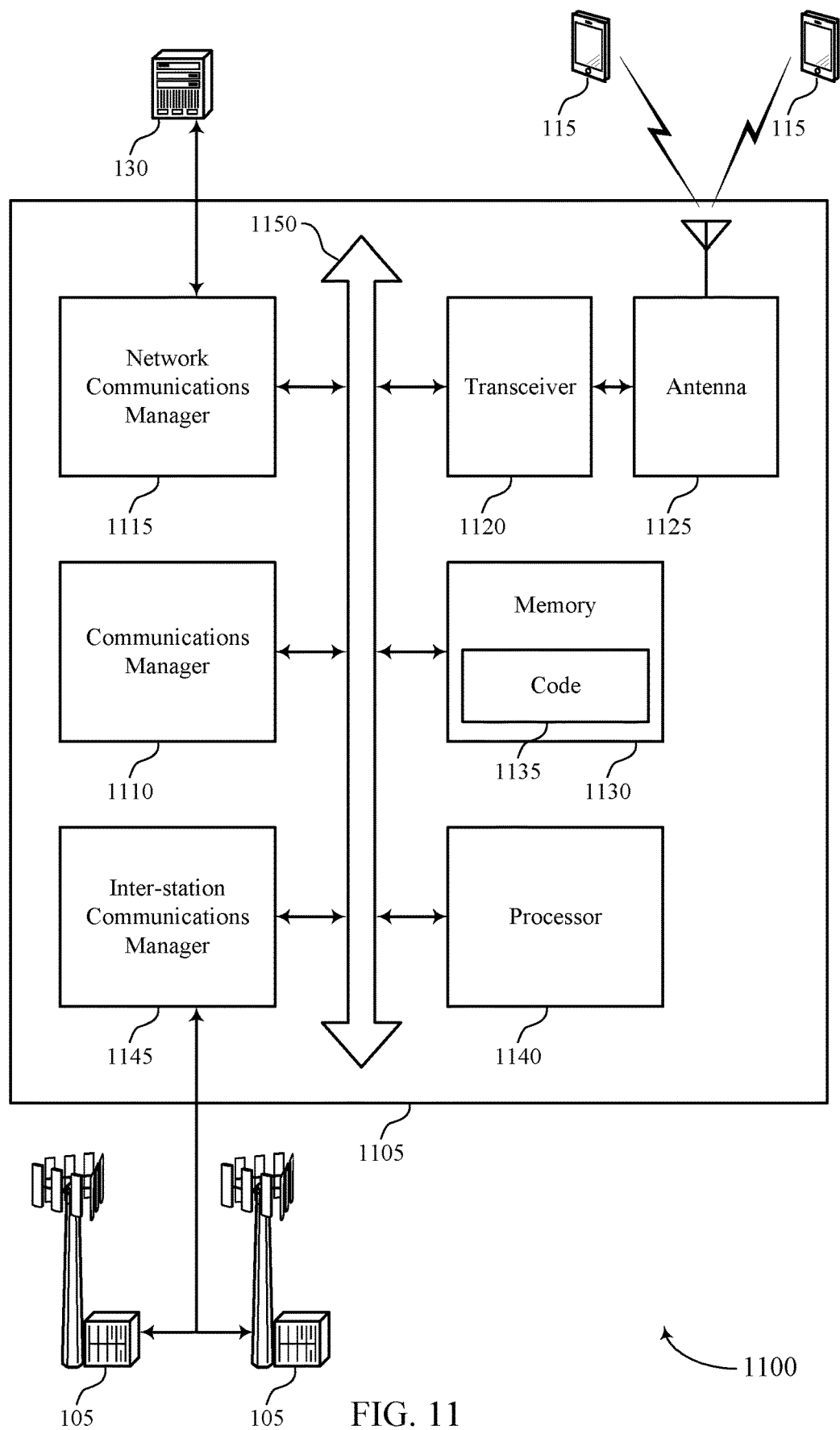
FIG. 11 shows a diagram of a system including a device that supports sidelink groupcast scheduling in accordance with one or more aspects of the present disclosure.

FIG. 11 shows a diagram of a system 1100 including a device 1105 that supports sidelink groupcast scheduling in accordance with one or more aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive, from a first UE of a group of UEs supported by the base station, a sidelink scheduling request for groupcast sidelink communications between the first UE and a set of UEs of the group of UEs, determine, based on the sidelink scheduling request, one or more UEs of the set of UEs and time-frequency resources for groupcast sidelink communications between the first UE and the one or more UEs, and transmit, to the first UE, a groupcast sidelink grant that indicates the time-frequency resources for groupcast sidelink communications between the first UE and one or more UEs of the set of UEs.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting sidelink groupcast scheduling).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
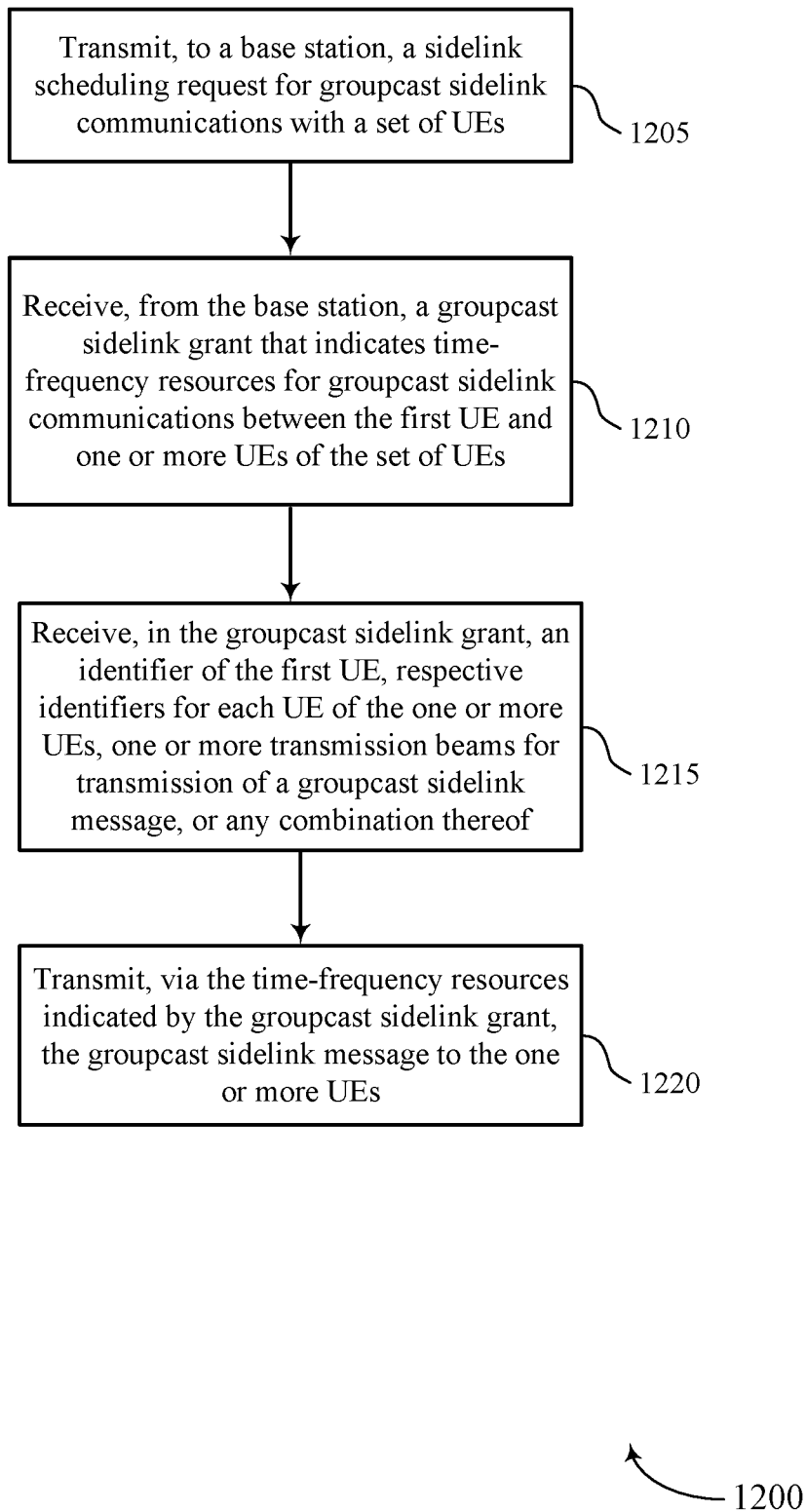
FIGS. 12 through 17 show flowcharts illustrating methods that support sidelink groupcast scheduling in accordance with one or more aspects of the present disclosure.

FIG. 12 shows a flowchart illustrating a method 1200 that supports sidelink groupcast scheduling in accordance with one or more aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may transmit, to a base station, a sidelink scheduling request for groupcast sidelink communications with a set of UEs. The operations of 1205 may be performed according to the methods described herein. In some examples, aspects of the operations of 1205 may be performed by a sidelink scheduling component as described with reference to FIGS. 4 through 7.

At 1210, the UE may receive, from the base station, a groupcast sidelink grant that indicates time-frequency resources for groupcast sidelink communications between the first UE and one or more UEs of the set of UEs. The operations of 1210 may be performed according to the methods described herein. In some examples, aspects of the operations of 1210 may be performed by a grant reception component as described with reference to FIGS. 4 through 7.

At 1215, the UE may receive, in the groupcast sidelink grant, an identifier of the UE, respective identifiers for each UE of the one or more UEs, one or more transmission beams for transmission of a groupcast sidelink message, or any combination thereof. The operations of 1215 may be performed according to the methods described herein. In some examples, aspects of the operations of 1215 may be performed by an ID component as described with reference to FIGS. 4 through 7.

At 1220, the UE may transmit, via the time-frequency resources indicated by the groupcast sidelink grant, the groupcast sidelink message to the one or more UEs. The operations of 1220 may be performed according to the methods described herein. In some examples, aspects of the operations of 1220 may be performed by a groupcast sidelink component as described with reference to FIGS. 4 through 7.

Figure 13:
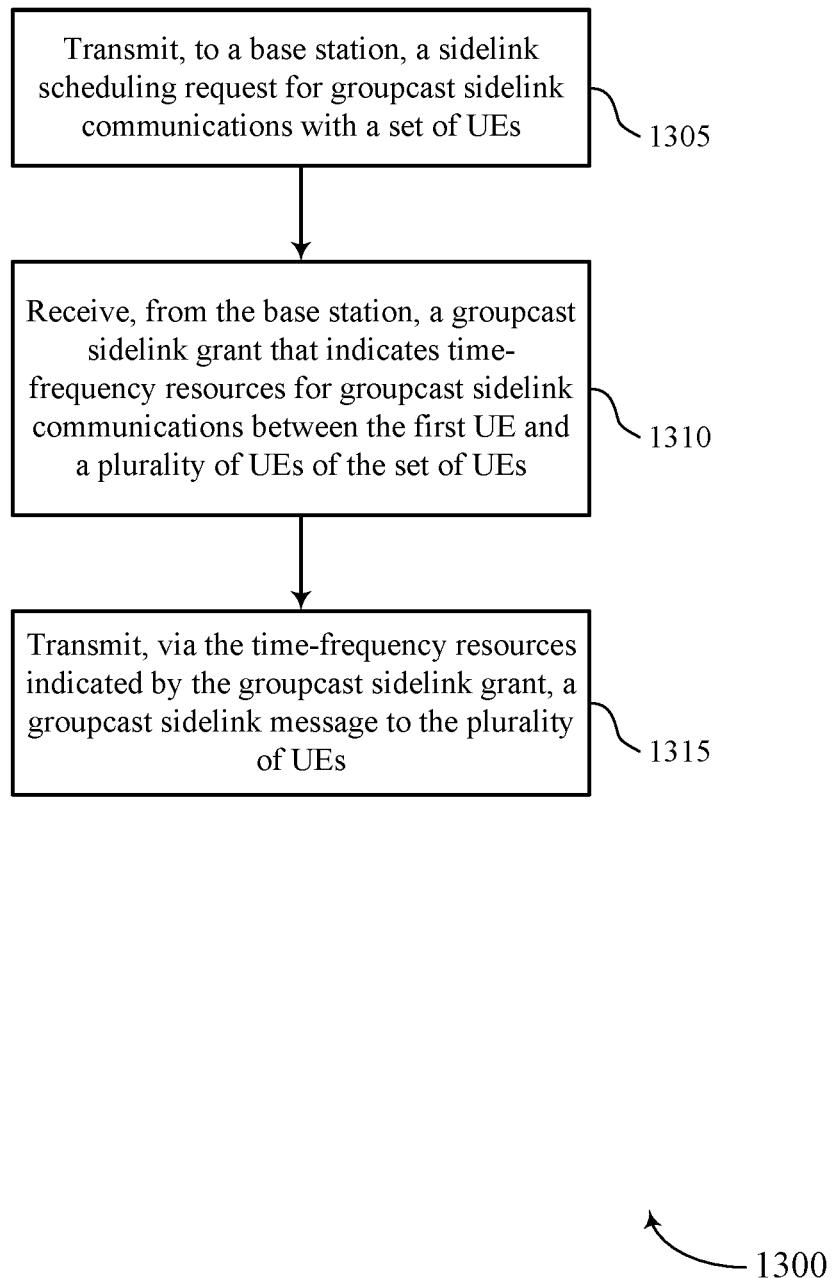

FIG. 13 shows a flowchart illustrating a method 1300 that supports sidelink groupcast scheduling in accordance with one or more aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may transmit, to a base station, a sidelink scheduling request for groupcast sidelink communications with a set of UEs. The operations of 1305 may be performed according to the methods described herein. In some examples, aspects of the operations of 1305 may be performed by a sidelink scheduling component as described with reference to FIGS. 4 through 7.

At 1310, the UE may receive, from the base station, a groupcast sidelink grant that indicates time-frequency resources for groupcast sidelink communications between the first UE and a plurality of UEs of the set of UEs. The operations of 1310 may be performed according to the methods described herein. In some examples, aspects of the operations of 1310 may be performed by a grant reception component as described with reference to FIGS. 4 through 7.

At 1315, the UE may transmit, via the time-frequency resources indicated by the groupcast sidelink grant, a groupcast sidelink message to the plurality of UEs. The operations of 1315 may be performed according to the methods described herein. In some examples, aspects of the operations of 1315 may be performed by a groupcast sidelink component as described with reference to FIGS. 4 through 7.

Figure 14:
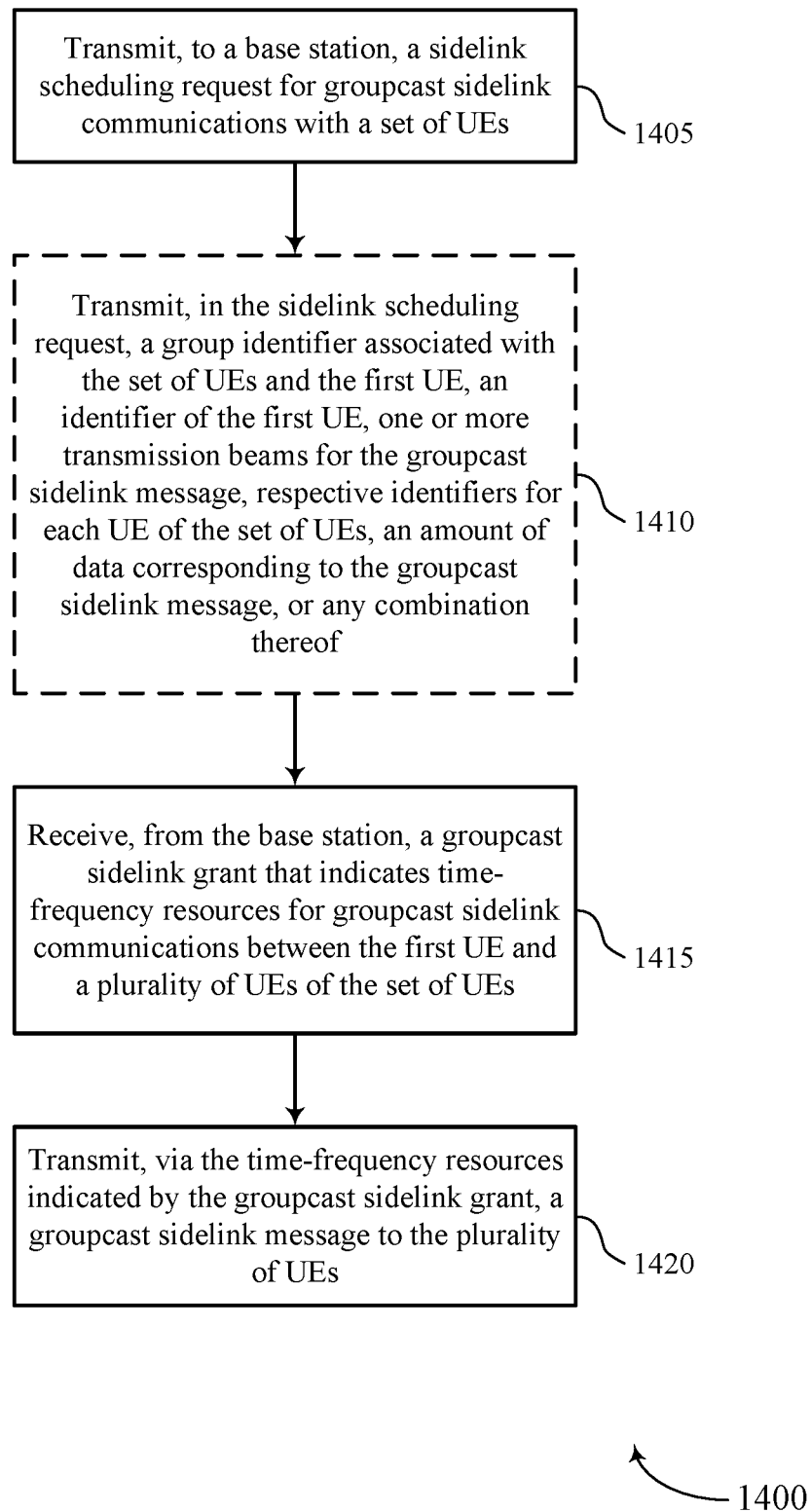

FIG. 14 shows a flowchart illustrating a method 1400 that supports sidelink groupcast scheduling in accordance with one or more aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may transmit, to a base station, a sidelink scheduling request for groupcast sidelink communications with a set of UEs. The operations of 1405 may be performed according to the methods described herein. In some examples, aspects of the operations of 1405 may be performed by a sidelink scheduling component as described with reference to FIGS. 4 through 7.

At 1410, the UE may transmit, in the sidelink scheduling request, a group identifier associated with the set of UEs and the first UE, an identifier of the first UE, one or more transmission beams for the groupcast sidelink message, respective identifiers for each UE of the set of UEs, an amount of data corresponding to the groupcast sidelink message, or any combination thereof. The operations of 1410 may be performed according to the methods described herein. In some examples, aspects of the operations of 1410 may be performed by an ID component as described with reference to FIGS. 4 through 7.

At 1415, the UE may receive, from the base station, a groupcast sidelink grant that indicates time-frequency resources for groupcast sidelink communications between the first UE and a plurality of UEs of the set of UEs. The operations of 1415 may be performed according to the methods described herein. In some examples, aspects of the operations of 1415 may be performed by a grant reception component as described with reference to FIGS. 4 through 7.

At 1420, the UE may transmit, via the time-frequency resources indicated by the groupcast sidelink grant, a groupcast sidelink message to the plurality of UEs. The operations of 1420 may be performed according to the methods described herein. In some examples, aspects of the operations of 1420 may be performed by a groupcast sidelink component as described with reference to FIGS. 4 through 7.

Figure 15:
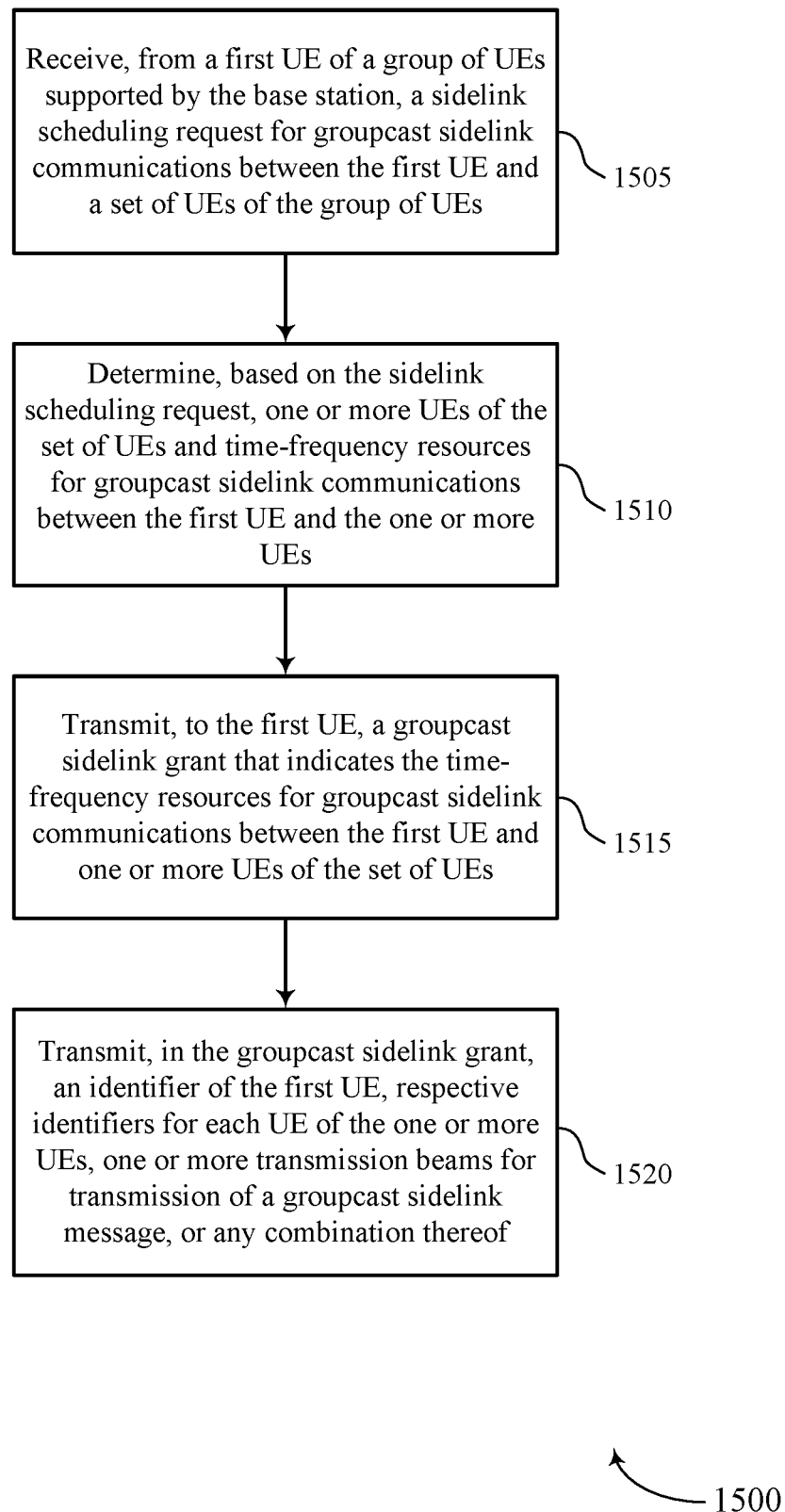

FIG. 15 shows a flowchart illustrating a method 1500 that supports sidelink groupcast scheduling in accordance with one or more aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may receive, from a first UE of a group of UEs supported by the base station, a sidelink scheduling request for groupcast sidelink communications between the first UE and a set of UEs of the group of UEs. The operations of 1505 may be performed according to the methods described herein. In some examples, aspects of the operations of 1505 may be performed by a scheduling reception component as described with reference to FIGS. 8 through 11.

At 1510, the base station may determine, based on the sidelink scheduling request, one or more UEs of the set of UEs and time-frequency resources for groupcast sidelink communications between the first UE and the one or more UEs. The operations of 1510 may be performed according to the methods described herein. In some examples, aspects of the operations of 1510 may be performed by a resource determination component as described with reference to FIGS. 8 through 11.

At 1515, the base station may transmit, to the first UE, a groupcast sidelink grant that indicates the time-frequency resources for groupcast sidelink communications between the first UE and one or more UEs of the set of UEs. The operations of 1515 may be performed according to the methods described herein. In some examples, aspects of the operations of 1515 may be performed by a grant transmission component as described with reference to FIGS. 8 through 11.

At 1520, the base station may transmit, in the groupcast sidelink grant, an identifier of the first UE, respective identifiers for each UE of the one or more UEs, one or more transmission beams for transmission of a groupcast sidelink message, or any combination thereof. The operations of 1520 may be performed according to the methods described herein. In some examples, aspects of the operations of 1520 may be performed by an ID module as described with reference to FIGS. 8 through 11.

Figure 16:
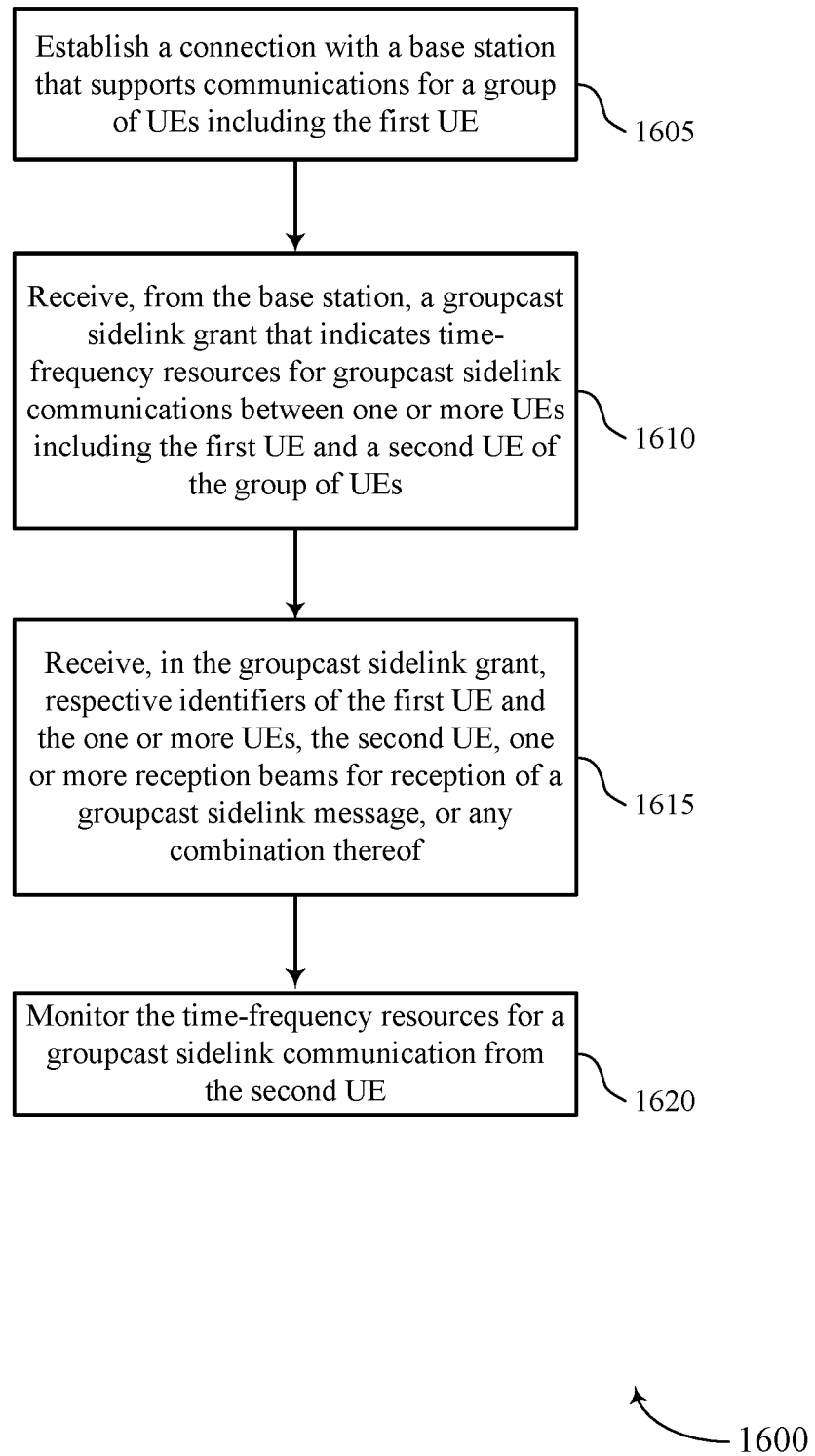

FIG. 16 shows a flowchart illustrating a method 1600 that supports sidelink groupcast scheduling in accordance with one or more aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1605, the UE may establish a connection with a base station that supports communications for a group of UEs including the first UE. The operations of 1605 may be performed according to the methods described herein. In some examples, aspects of the operations of 1605 may be performed by a connection establishment component as described with reference to FIGS. 4 through 7.

At 1610, the UE may receive, from the base station, a groupcast sidelink grant that indicates time-frequency resources for groupcast sidelink communications between one or more UEs including the first UE and a second UE of the group of UEs. The operations of 1610 may be performed according to the methods described herein. In some examples, aspects of the operations of 1610 may be performed by a sidelink grant reception component as described with reference to FIGS. 4 through 7.

At 1615, the UE may receive, in the groupcast sidelink grant, respective identifiers of the first UE and the one or more UEs, the second UE, one or more reception beams for reception of a groupcast sidelink message, or any combination thereof. The operations of 1615 may be performed according to the methods described herein. In some examples, aspects of the operations of 1615 may be performed by an ID component as described with reference to FIGS. 4 through 7.

At 1620, the UE may monitor the time-frequency resources for a groupcast sidelink communication from the second UE. The operations of 1620 may be performed according to the methods described herein. In some examples, aspects of the operations of 1620 may be performed by a monitoring component as described with reference to FIGS. 4 through 7.

Figure 17:
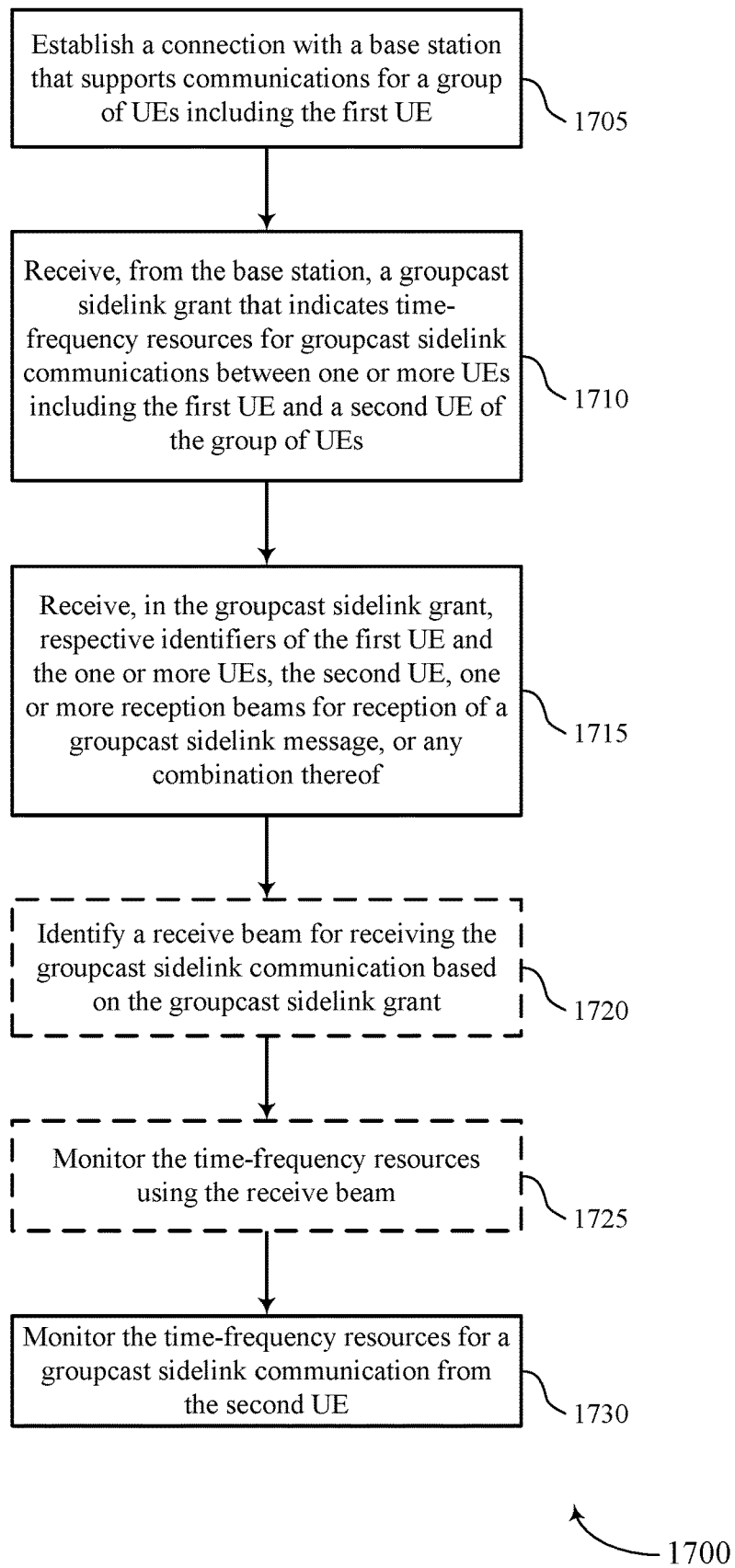

FIG. 17 shows a flowchart illustrating a method 1700 that supports sidelink groupcast scheduling in accordance with one or more aspects of the present disclosure. The operations of method 1700 may be implemented by a UE 115 or its components as described herein. For example, the operations of method 1700 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1705, the UE may establish a connection with a base station that supports communications for a group of UEs including the first UE. The operations of 1705 may be performed according to the methods described herein. In some examples, aspects of the operations of 1705 may be performed by a connection establishment component as described with reference to FIGS. 4 through 7.

At 1710, the UE may receive, from the base station, a groupcast sidelink grant that indicates time-frequency resources for groupcast sidelink communications between one or more UEs including the first UE and a second UE of the group of UEs. The operations of 1710 may be performed according to the methods described herein. In some examples, aspects of the operations of 1710 may be performed by a sidelink grant reception component as described with reference to FIGS. 4 through 7.

At 1715, the UE may receive, in the groupcast sidelink grant, respective identifiers of the first UE and the one or more UEs, the second UE, one or more reception beams for reception of a groupcast sidelink message, or any combination thereof. The operations of 1715 may be performed according to the methods described herein. In some examples, aspects of the operations of 1715 may be performed by an ID component as described with reference to FIGS. 4 through 7.

At 1720, the UE may identify a receive beam for receiving the groupcast sidelink communication based on the groupcast sidelink grant. The operations of 1720 may be performed according to the methods described herein. In some examples, aspects of the operations of 1720 may be performed by a receive beam determination component as described with reference to FIGS. 4 through 7.

At 1725, the UE may monitor the time-frequency resources using the receive beam. The operations of 1725 may be performed according to the methods described herein. In some examples, aspects of the operations of 1725 may be performed by a monitoring component as described with reference to FIGS. 4 through 7.

At 1730, the UE may monitor the time-frequency resources for a groupcast sidelink communication from the second UE. The operations of 1730 may be performed according to the methods described herein. In some examples, aspects of the operations of 1730 may be performed by a monitoring component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first UE, comprising: transmitting, to a base station, a sidelink scheduling request for groupcast sidelink communications with a set of UEs; receiving, from the base station, a groupcast sidelink grant that indicates time-frequency resources for groupcast sidelink communications between the first UE and one or more UEs of the set of UEs; receiving, in the groupcast sidelink grant, an identifier of the first UE, respective identifiers for each UE of the one or more UEs, one or more transmission beams for transmission of a groupcast sidelink message, or any combination thereof and transmitting, via the time-frequency resources indicated by the groupcast sidelink grant, the groupcast sidelink message to the one or more UEs.

Aspect 2: The method of aspect 1, further comprising: transmitting, in the sidelink scheduling request, a group identifier associated with the set of UEs and the first UE, the identifier of the first UE, one or more transmission beams for the groupcast sidelink message, respective identifiers for each UE of the set of UEs, an amount of data corresponding to the groupcast sidelink message, or any combination thereof.

Aspect 3: The method of any one of aspects 1 and 2, wherein the one or more transmission beams are a subset of a set of transmission beams included in the sidelink scheduling request.

Aspect 4: The method of any one of aspects 1 through 3, further comprising: transmitting the sidelink scheduling request in a RRC message, a MAC-CE, a SR, a BSR, or any combination thereof.

Aspect 5: The method of aspect 4, wherein the BSR indicates an amount of data remaining in a buffer of the first UE for transmission via a groupcast sidelink communication.

Aspect 6: The method of any one of aspects 1 through 5, further comprising: receiving, independent of the sidelink scheduling request, an indication to transmit one or more groupcast sidelink messages based at least in part on a size of a groupcast buffer of the first UE.

Aspect 7: The method of aspect 6, wherein the size of the groupcast buffer of the first UE is above a buffer threshold.

Aspect 8: The method of any one of aspects 1 through 7, further comprising: receiving the groupcast sidelink grant in a RRC message, a MAC-CE, a DCI transmission, or any combination thereof.

Aspect 9: The method of any one of aspects 1 through 8, wherein the set of UEs is a subgroup of a group of UEs including the first UE.

Aspect 10: The method of aspect 9, further comprising: determining the set of UEs based at least in part on a beam training procedure for groupcast sidelink communications.

Aspect 11: The method of aspect 10, further comprising: transmitting a request to perform a groupcast sidelink communication with a plurality of UEs supported by the base station; and receiving, in response to the request, an indication of the one or more UEs of the set of UEs.

Aspect 12: A method for wireless communications at a first UE, comprising: transmitting, to a base station, a sidelink scheduling request for groupcast sidelink communications with a set of UEs; receiving, from the base station, a groupcast sidelink grant that indicates time-frequency resources for groupcast sidelink communications between the first UE and a plurality of UEs of the set of UEs; and transmitting, via the time-frequency resources indicated by the groupcast sidelink grant, a groupcast sidelink message to the plurality of UEs.

Aspect 13: The method of aspect 12, further comprising: transmitting, in the sidelink scheduling request, a group identifier associated with the set of UEs and the first UE, an identifier of the first UE, one or more transmission beams for the groupcast sidelink message, respective identifiers for each UE of the set of UEs, an amount of data corresponding to the groupcast sidelink message, or any combination thereof.

Aspect 14: The method of any one of aspects 12 and 13, further comprising: receiving, in the groupcast sidelink grant, an identifier of the first UE, respective identifiers for each UE of the plurality of UEs, one or more transmission beams for transmission of the groupcast sidelink message, or any combination thereof.

Aspect 15: The method of aspect 14, wherein the one or more transmission beams are a subset of a set of transmission beams included in the sidelink scheduling request.

Aspect 16: The method of any one of aspects 12 through 15, further comprising: transmitting the sidelink scheduling request in a RRC message, a MAC-CE, a SR, a BSR, or any combination thereof.

Aspect 17: The method of aspect 16, wherein the BSR indicates an amount of data remaining in a buffer of the first UE for transmission via a groupcast sidelink communication.

Aspect 18: The method of any one of aspects 12 through 17, further comprising: receiving, independent of the sidelink scheduling request, an indication to transmit one or more groupcast sidelink messages based at least in part on a size of a groupcast buffer of the first UE.

Aspect 19: The method of aspect 18, wherein the size of the groupcast buffer of the first UE is above a buffer threshold.

Aspect 20: The method of any one of aspects 12 through 19, further comprising: receiving the groupcast sidelink grant in a RRC message, a MAC-CE, a DCI transmission, or any combination thereof.

Aspect 21: The method of any one of aspects 12 through 20, wherein the set of UEs is a subgroup of a group of UEs including the first UE.

Aspect 22: The method of aspect 21, further comprising: determining the set of UEs based at least in part on a beam training procedure for groupcast sidelink communications.

Aspect 23: The method of aspect 22, further comprising: transmitting a request to perform a groupcast sidelink communication with a plurality of UEs supported by the base station; and receiving, in response to the request, an indication of the one or more UEs of the set of UEs.

Aspect 24: A method for wireless communications at a base station, comprising: receiving, from a first UE of a group of UEs supported by the base station, a sidelink scheduling request for groupcast sidelink communications between the first UE and a set of UEs of the group of UEs; determining, based at least in part on the sidelink scheduling request, one or more UEs of the set of UEs and time-frequency resources for groupcast sidelink communications between the first UE and the one or more UEs; transmitting, to the first UE, a groupcast sidelink grant that indicates the time-frequency resources for groupcast sidelink communications between the first UE and the one or more UEs of the set of UEs; and transmitting, in the groupcast sidelink grant, an identifier of the first UE, respective identifiers for each UE of the one or more UEs, one or more transmission beams for transmission of a groupcast sidelink message, or any combination thereof.

Aspect 25: The method of aspect 24, further comprising: receiving, in the sidelink scheduling request, a group identifier associated with the group of UEs, the identifier of the first UE, one or more transmission beams for the groupcast sidelink message, respective identifiers for each UE of the set of UEs, an amount of data corresponding to the groupcast sidelink message for transmission by the first UE, or any combination thereof.

Aspect 26: The method of any one of aspects 24 or 25, further comprising: identifying a set of transmission beams included in the sidelink scheduling request; and determining the one or more transmission beams for transmission of the groupcast sidelink message, wherein the one or more transmission beams are a subset of the set of transmission beams.

Aspect 27: The method of any one of aspects 24 through 26, further comprising: transmitting the groupcast sidelink grant to each of the one or more UEs.

Aspect 28: The method of any one of aspects 24 through 27, further comprising: receiving the sidelink scheduling request in a RRC message, a MAC-CE, a SR, a BSR, or any combination thereof.

Aspect 29: The method of aspect 28, wherein the BSR indicates an amount of data remaining in a buffer of the first UE for transmission via a groupcast sidelink communication.

Aspect 30: The method of any one of aspects 24 through 29, further comprising: transmitting, independent of the sidelink scheduling request, an indication for the first UE to transmit one or more groupcast sidelink messages based at least in part on a size of a groupcast buffer of the first UE.

Aspect 31: The method of aspect 30, wherein the size of the groupcast buffer of the first UE is above a buffer threshold.

Aspect 32: The method of any one of aspects 24 through 31, further comprising: transmitting the groupcast sidelink grant in a RRC message, a MAC-CE, a DCI transmission, or any combination thereof.

Aspect 33: The method of any one of aspects 24 through 32, further comprising: determining a transmission configuration for groupcast sidelink communications between the first UE and the one or more UEs of the set of UEs, wherein the transmission configuration indicates multiple transmission beams for the first UE, a MCS, a TCI, or any combination thereof.

Aspect 34: The method of any one of aspects 24 through 32, further comprising: receiving a request for a groupcast sidelink communication to a plurality of UEs supported by the base station; determining the one or more UEs of the plurality of UEs based at least in part on the request; and transmitting, in response to the request, an indication of the one or more UEs for groupcast sidelink communications.

Aspect 35: A method for wireless communications at a base station, comprising: receiving, from a first UE of a group of UEs supported by the base station, a sidelink scheduling request for groupcast sidelink communications between the first UE and a set of UEs of the group of UEs; determining, based at least in part on the sidelink scheduling request, a plurality of UEs of the set of UEs and time-frequency resources for groupcast sidelink communications between the first UE and the plurality of UEs; and transmitting, to the first UE, a groupcast sidelink grant that indicates the time-frequency resources for groupcast sidelink communications between the first UE and the plurality of UEs of the set of UEs.

Aspect 36: The method of aspect 35, further comprising: receiving, in the sidelink scheduling request, a group identifier associated with the group of UEs, an identifier of the first UE, one or more transmission beams for a groupcast sidelink message, respective identifiers for each UE of the set of UEs, an amount of data corresponding to the groupcast sidelink message for transmission by the first UE, or any combination thereof.

Aspect 37: The method of any one of aspects 35 and 36, further comprising: transmitting, in the groupcast sidelink grant, an identifier of the first UE, respective identifiers for each UE of the plurality of UEs, one or more transmission beams for transmission of the groupcast sidelink message, or any combination thereof.

Aspect 38: The method of aspect 37, further comprising: identifying a set of transmission beams included in the sidelink scheduling request; and determining the one or more transmission beams for transmission of the groupcast sidelink message, wherein the one or more transmission beams are a subset of the set of transmission beams.

Aspect 39: The method of any one of aspects 35 through 38, further comprising: transmitting the groupcast sidelink grant to each of the one or more UEs.

Aspect 40: The method of any one of aspects 35 through 39, further comprising: receiving the sidelink scheduling request in a RRC message, a MAC-CE, a SR, a BSR, or any combination thereof.

Aspect 41: The method of aspect 40, wherein the BSR indicates an amount of data remaining in a buffer of the first UE for transmission via a groupcast sidelink communication.

Aspect 42: The method of any one of aspects 35 through 41, further comprising: transmitting, independent of the sidelink scheduling request, an indication for the first UE to transmit one or more groupcast sidelink messages based at least in part on a size of a groupcast buffer of the first UE.

Aspect 43: The method of aspect 42, wherein the size of the groupcast buffer of the first UE is above a buffer threshold.

Aspect 44: The method of any one of aspects 35 through 43, further comprising: transmitting the groupcast sidelink grant in a RRC message, a MAC-CE, a DCI transmission, or any combination thereof.

Aspect 45: The method of any one of aspects 35 through 44, further comprising: determining a transmission configuration for groupcast sidelink communications between the first UE and one or more UEs of the set of UEs, wherein the transmission configuration indicates multiple transmission beams for the first UE, a MCS, a TCI, or any combination thereof.

Aspect 46: The method of any one of aspects 35 through 45, further comprising: receiving a request for a groupcast sidelink communication to a plurality of UEs supported by the base station; determining the one or more UEs of the plurality of UEs based at least in part on the request; and transmitting, in response to the request, an indication of the one or more UEs for groupcast sidelink communications.

Aspect 47: A method for wireless communications at a first user equipment UE, comprising: establishing a connection with a base station that supports communications for a group of UEs including the first UE; receiving, from the base station, a groupcast sidelink grant that indicates time-frequency resources for groupcast sidelink communications between one or more UEs including the first UE and a second UE of the group of UEs; receiving, in the groupcast sidelink grant, respective identifiers of the first UE and the one or more UEs, the second UE, one or more reception beams for reception of a groupcast sidelink message, or any combination thereof and monitoring the time-frequency resources for a groupcast sidelink communication from the second UE.

Aspect 48: The method of aspect 47, further comprising: identifying a receive beam for receiving the groupcast sidelink communication based at least in part on the groupcast sidelink grant; and monitoring the time-frequency resources using the receive beam.

Aspect 49: The method of any one of aspects 47 and 48, further comprising: receiving the groupcast sidelink grant in a groupcast transmission or a dedicated transmission from the base station.

Aspect 50: The method of any one of aspects 47 through 49, further comprising: receiving the groupcast sidelink grant in a RRC message, a MAC-CE, a DCI transmission, or any combination thereof.

Aspect 51: A method for wireless communications at a first user equipment UE, comprising: establishing a connection with a base station that supports communications for a group of UEs including the first UE; receiving, from the base station, a groupcast sidelink grant that indicates time-frequency resources for groupcast sidelink communications between a plurality of UEs including the first UE and a second UE of the group of UEs; and monitoring the time-frequency resources for a groupcast sidelink communication from the second UE Aspect 52: The method of aspect 51, further comprising: identifying a receive beam for receiving the groupcast sidelink communication based at least in part on the groupcast sidelink grant; and monitoring the time-frequency resources using the receive beam.

Aspect 53: The method of any one of aspects 51 and 52, further comprising: receiving, in the groupcast sidelink grant, respective identifiers of the first UE and the plurality of UEs, the second UE, one or more reception beams for reception of a groupcast sidelink message, or any combination thereof.

Aspect 54: The method of any one of aspects 51 through 53, further comprising: receiving the groupcast sidelink grant in a groupcast transmission or a dedicated transmission from the base station.

Aspect 55: The method of any one of aspects 51 through 54, further comprising: receiving the groupcast sidelink grant in a RRC message, a MAC-CE, a DCI transmission, or any combination thereof.

Aspect 56: An apparatus for wireless communication comprising at least one means for performing a method of any one of aspects 1 through 11.

Aspect 57: An apparatus for wireless communication comprising a processor and memory coupled to the processor, the processor and memory configured to perform a method of any one of aspects 1 through 11.

Aspect 58: A non-transitory computer-readable medium storing code for wireless communication, the code comprising instructions executable by a processor to perform a method of any one of aspects 1 through 11.

Aspect 59: An apparatus for wireless communication comprising at least one means for performing a method of any one of aspects 12 through 23.

Aspect 60: An apparatus for wireless communication comprising a processor and memory coupled to the processor, the processor and memory configured to perform a method of any one of aspects 12 through 23.

Aspect 61: A non-transitory computer-readable medium storing code for wireless communication, the code comprising instructions executable by a processor to perform a method of any one of aspects 12 through 23.

Aspect 62: An apparatus for wireless communication comprising at least one means for performing a method of any one of aspects 24 through 34.

Aspect 63: An apparatus for wireless communication comprising a processor and memory coupled to the processor, the processor and memory configured to perform a method of any one of aspects 24 through 34.

Aspect 64: A non-transitory computer-readable medium storing code for wireless communication, the code comprising instructions executable by a processor to perform a method of any one of aspects 24 through 34.

Aspect 65: An apparatus for wireless communication comprising at least one means for performing a method of any one of aspects 35 through 46.

Aspect 66: An apparatus for wireless communication comprising a processor and memory coupled to the processor, the processor and memory configured to perform a method of any one of aspects 35 through 46.

Aspect 67: A non-transitory computer-readable medium storing code for wireless communication, the code comprising instructions executable by a processor to perform a method of any one of aspects 35 through 46.

Aspect 68: An apparatus for wireless communication comprising at least one means for performing a method of any one of aspects 47 through 50.

Aspect 69: An apparatus for wireless communication comprising a processor and memory coupled to the processor, the processor and memory configured to perform a method of any one of aspects 47 through 50.

Aspect 70: A non-transitory computer-readable medium storing code for wireless communication, the code comprising instructions executable by a processor to perform a method of any one of aspects 47 through 50.

Aspect 71: An apparatus for wireless communication comprising at least one means for performing a method of any one of aspects 51 through 55.

Aspect 72: An apparatus for wireless communication comprising a processor and memory coupled to the processor, the processor and memory configured to perform a method of any one of aspects 51 through 55.

Aspect 73: A non-transitory computer-readable medium storing code for wireless communication, the code comprising instructions executable by a processor to perform a method of any one of aspects 51 through 55.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
    transmitting, to a network node, a sidelink scheduling request for groupcast sidelink communications with a set of UEs;
    transmitting, in the sidelink scheduling request, an indication of a set of transmission beams for the groupcast sidelink communications;
    receiving, from the network node based at least in part on the sidelink scheduling request, a groupcast sidelink grant that indicates time-frequency resources for groupcast sidelink communications between the first UE and one or more UEs of the set of UEs;
    receiving, in the groupcast sidelink grant, an identifier of the first UE, respective identifiers for each UE of the one or more UEs, and a subset of one or more transmission beams for transmission of a groupcast sidelink message, the subset of one or more transmission beams selected from the set of transmission beams indicated via the sidelink scheduling request; and
    transmitting, via the time-frequency resources indicated by the groupcast sidelink grant and using the subset of one or more transmission beams, the groupcast sidelink message to the one or more UEs.

2. The method of claim 1, further comprising:
    transmitting, in the sidelink scheduling request, a group identifier associated with the set of UEs and the first UE, the identifier of the first UE, respective identifiers for each UE of the set of UEs, an amount of data corresponding to the groupcast sidelink message, or any combination thereof.

3. The method of claim 1, further comprising:
    transmitting the sidelink scheduling request in a radio resource control (RRC) message, a medium access control (MAC) control element (MAC-CE), a scheduling request (SR), a buffer status report (BSR), or any combination thereof.

4. The method of claim 3, wherein the sidelink scheduling request is transmitted in the BSR and the BSR indicates an amount of data remaining in a buffer of the first UE for transmission via a groupcast sidelink communication.

5. The method of claim 1, further comprising:
    receiving, independent of the sidelink scheduling request, an indication to transmit one or more groupcast sidelink messages based at least in part on a size of a groupcast buffer of the first UE.

6. The method of claim 5, wherein the size of the groupcast buffer of the first UE is above a buffer threshold.

7. The method of claim 1, further comprising:
    receiving the groupcast sidelink grant in a radio resource control (RRC) message, a medium access control (MAC) control element (MAC-CE), a downlink control information (DCI) transmission, or any combination thereof.

8. The method of claim 1, wherein the set of UEs is a subgroup of a group of UEs including the first UE.

9. The method of claim 8, further comprising:
    determining the set of UEs based at least in part on a beam training procedure for groupcast sidelink communications.

10. The method of claim 9, further comprising:
    transmitting a request to perform a groupcast sidelink communication with a plurality of UEs supported by the network node; and
    receiving, in response to the request, an indication of the one or more UEs of the set of UEs.

11. A method for wireless communications at a first user equipment (UE), comprising:
    transmitting, to a network node, a sidelink scheduling request for groupcast sidelink communications with a set of UEs;
    transmitting, in the sidelink scheduling request, an indication of a set of transmission beams for the groupcast sidelink communications;
    receiving, from the network node based at least in part on the sidelink scheduling request, a groupcast sidelink grant that indicates time-frequency resources for groupcast sidelink communications between the first UE and a plurality of UEs of the set of UEs;
    receiving, in the groupcast sidelink grant, a subset of one or more transmission beams for transmission of a groupcast sidelink message, the subset of one or more transmission beams selected from the set of transmission beams indicated via the sidelink scheduling request; and
    transmitting, via the time-frequency resources indicated by the groupcast sidelink grant and using the subset of one or more transmission beams, a groupcast sidelink message to the plurality of UEs.

12. The method of claim 11, further comprising:
    transmitting, in the sidelink scheduling request, a group identifier associated with the set of UEs and the first UE, an identifier of the first UE, respective identifiers for each UE of the set of UEs, an amount of data corresponding to the groupcast sidelink message, or any combination thereof.

13. The method of claim 11, further comprising:
    receiving, in the groupcast sidelink grant, an identifier of the first UE, respective identifiers for each UE of the plurality of UEs, or both.

14. A method for wireless communications at a network node, comprising:
  receiving, a sidelink scheduling request for groupcast sidelink communications between a first user equipment (UE) and a group of UEs;
  receiving, in the sidelink scheduling request, an indication of a set of transmission beams for the groupcast sidelink communications;
  transmitting a groupcast sidelink grant that indicates a subset of one or more transmission beams from the set of transmission beams indicated via the sidelink scheduling request and time-frequency resources for groupcast sidelink communications between the first UE and one or more UEs of the group of UEs; and
  transmitting, in the groupcast sidelink grant, an identifier of the first UE, respective identifiers for each UE of the one or more UEs, and the subset of one or more transmission beams selected from the set of transmission beams for transmission of a groupcast sidelink message.

15. The method of claim 14, further comprising:
  receiving, in the sidelink scheduling request, a group identifier associated with the group of UEs, the identifier of the first UE, respective identifiers for each UE of the group of UEs, an amount of data corresponding to the groupcast sidelink message for transmission by the first UE, or any combination thereof.

16. The method of claim 14, further comprising:
  determining the subset of one or more transmission beams for transmission of the groupcast sidelink message based at least in part on the set of transmission beams indicated via the sidelink scheduling request.

17. The method of claim 14, further comprising:
  transmitting the groupcast sidelink grant to each of the one or more UEs.

18. The method of claim 14, further comprising:
  receiving the sidelink scheduling request in a radio resource control (RRC) message, a medium access control (MAC) control element (MAC-CE), a scheduling request (SR), a buffer status report (BSR), or any combination thereof.

19. The method of claim 18, wherein the sidelink scheduling request is received in the BSR and the BSR indicates an amount of data remaining in a buffer of the first UE for transmission via a groupcast sidelink communication.

20. The method of claim 14, further comprising:
  transmitting, independent of the sidelink scheduling request, an indication for the first UE to transmit one or more groupcast sidelink messages based at least in part on a size of a groupcast buffer of the first UE.

21. The method of claim 20, wherein the size of the groupcast buffer of the first UE is above a buffer threshold.

22. The method of claim 14, further comprising:
  transmitting the groupcast sidelink grant in a radio resource control (RRC) message, a medium access control (MAC) control element (MAC-CE), a downlink control information (DCI) transmission, or any combination thereof.

23. The method of claim 14, further comprising:
  determining a transmission configuration for groupcast sidelink communications between the first UE and the one or more UEs of the group of UEs, wherein the transmission configuration indicates multiple transmission beams for the first UE, a modulation coding scheme (MCS), a transmission configuration indicator (TCI), or any combination thereof.

24. The method of claim 14, further comprising:
  determining the one or more UEs of the group of UEs based at least in part on the sidelink scheduling request; and
  transmitting, in response to the sidelink scheduling request, an indication of the one or more UEs for the groupcast sidelink communications.

25. A method for wireless communications at a first user equipment (UE), comprising:
  establishing a connection with a network node that supports communications for a group of UEs including the first UE;
  receiving, from the network node, a groupcast sidelink grant that indicates time-frequency resources for groupcast sidelink communications between one or more UEs including the first UE and a second UE of the group of UEs;
  receiving, in the groupcast sidelink grant, respective identifiers of the first UE and the one or more UEs, an identifier of the second UE, a subset of one or more transmission beams for transmission of a groupcast sidelink message, and a subset of one or more reception beams for reception of the groupcast sidelink message; and
  monitoring the time-frequency resources for a groupcast sidelink communication from the second UE using at least one reception beam of the subset of one or more reception beams indicated via the groupcast sidelink grant.

26. The method of claim 25, further comprising:
  receiving the groupcast sidelink grant in a groupcast transmission or a dedicated transmission from the network node.

27. The method of claim 25, further comprising:
  receiving the groupcast sidelink grant in a radio resource control (RRC) message, a medium access control (MAC) control element (MAC-CE), a downlink control information (DCI) transmission, or any combination thereof.

28. An apparatus for wireless communication at a first user equipment (UE), comprising:
  a processor; and
  memory coupled with the processor, the processor configured to:
    transmit, to a network node, a sidelink scheduling request for groupcast sidelink communications with a set of UEs;
    transmit, in the sidelink scheduling request, an indication of a set of transmission beams for the groupcast sidelink communications;
    receive, from the network node based at least in part on the sidelink scheduling request, a groupcast sidelink grant that indicates time-frequency resources for groupcast sidelink communications between the first UE and one or more UEs of the set of UEs;
    receive, in the groupcast sidelink grant, an identifier of the first UE, respective identifiers for each UE of the one or more UEs, and a subset of one or more transmission beams for transmission of a groupcast sidelink message, the subset of one or more transmission beams selected from the set of transmission beams indicated via the sidelink scheduling request; and
    transmit, via the time-frequency resources indicated by the groupcast sidelink grant and based at least in part on the subset of one or more transmission beams, the groupcast sidelink message to the one or more UEs.

29. The apparatus of claim 28, wherein the processor is further configured to:
  transmit, in the sidelink scheduling request, a group identifier associated with the set of UEs and the first UE, the identifier of the first UE, respective identifiers for each UE of the set of UEs, an amount of data corresponding to the groupcast sidelink message, or any combination thereof.

30. The apparatus of claim 28, further comprising:
  an antenna array, wherein the processor is further configured to:
    transmit, using the antenna array, the sidelink scheduling request in a radio resource control (RRC) message, a medium access control (MAC) control element (MAC-CE), a scheduling request (SR), a buffer status report (BSR), or any combination thereof.

31. The apparatus of claim 30, wherein the sidelink scheduling request is transmitted in the BSR and the BSR indicates an amount of data that remains in a buffer of the first UE for transmission via a groupcast sidelink communication.

32. The apparatus of claim 28, further comprising:
  an antenna array, wherein the processor is further configured to:
    receive, using the antenna array and independent of the sidelink scheduling request, an indication to transmit one or more groupcast sidelink messages based at least in part on a size of a groupcast buffer of the first UE.

33. An apparatus for wireless communications at a first user equipment (UE), comprising:
  a processor; and
  memory coupled with the processor, the processor configured to:
    transmit, to a network node, a sidelink scheduling request for groupcast sidelink communications with a set of UEs;
    transmit, in the sidelink scheduling request, an indication of a set of transmission beams for the groupcast sidelink communications;
    receive, from the network node based at least in part on the sidelink scheduling request, a groupcast sidelink grant that indicates time-frequency resources for groupcast sidelink communications between the first UE and a plurality of UEs of the set of UEs;
    receive, in the groupcast sidelink grant, a subset of one or more transmission beams for transmission of a groupcast sidelink message, the subset of one or more transmission beams selected from the set of transmission beams indicated via the sidelink scheduling request; and
    transmit, via the time-frequency resources indicated by the groupcast sidelink grant and using the subset of one or more transmission beams, a groupcast sidelink message to the plurality of UEs.

34. The apparatus of claim 33, further comprising:
  an antenna array, wherein the processor is further configured to:
    transmit, using the antenna array and in the sidelink scheduling request, a group identifier associated with the set of UEs and the first UE, an identifier of the first UE, respective identifiers for each UE of the set of UEs, an amount of data that corresponds to the groupcast sidelink message, or any combination thereof.

35. The apparatus of claim 33, further comprising:
  an antenna array, wherein the processor is further configured to:
    receive, using the antenna array and in the groupcast sidelink grant, an identifier of the first UE, respective identifiers for each UE of the plurality of UEs, or both.

36. An apparatus for wireless communications at a network node, comprising:
  a processor; and
  memory coupled with the processor, the processor configured to:
    receive a sidelink scheduling request for groupcast sidelink communications between a first user equipment (UE) and a group of UEs supported by the network node;
    receive, in the sidelink scheduling request, an indication of a set of transmission beams for the groupcast sidelink communications;
    transmit a groupcast sidelink grant that indicates a subset of one or more transmission beams from the set of transmission beams indicated via the sidelink scheduling request and time-frequency resources for groupcast sidelink communications between the first UE and one or more UEs of the group of UEs; and
    transmit, in the groupcast sidelink grant, an identifier of the first UE, respective identifiers for each UE of the one or more UEs, and the subset of one or more transmission beams selected from the set of transmission beams for transmission of a groupcast sidelink message.

37. The apparatus of claim 36, further comprising:
  an antenna array, wherein the processor is further configured to:
    receive, using the antenna array and in the sidelink scheduling request, a group identifier associated with the group of UEs, the identifier of the first UE, respective identifiers for each UE of the group of UEs, an amount of data that corresponds to the groupcast sidelink message for transmission by the first UE, or any combination thereof.

38. The apparatus of claim 36, wherein the processor is further configured to:
  determine the subset of one or more transmission beams for transmission of the groupcast sidelink message the set of transmission beams indicated via the sidelink scheduling request.

39. The apparatus of claim 36, further comprising:
  an antenna array, wherein the processor is further configured to:
    transmit, using the antenna array, the groupcast sidelink grant to each of the one or more UEs.

40. The apparatus of claim 36, further comprising:
  an antenna array, wherein the processor is further configured to:
    receive, using the antenna array, the sidelink scheduling request in a radio resource control (RRC) message, a medium access control (MAC) control element (MAC-CE), a scheduling request (SR), a buffer status report (BSR), or any combination thereof.

41. A apparatus for wireless communications at a first user equipment (UE), comprising:
  a processor; and
  memory coupled with the processor, the processor configured to:

establish a connection with a network node that supports communications for a group of UEs that includes the first UE;

receive, from the network node, a groupcast sidelink grant that indicates time-frequency resources for groupcast sidelink communications between one or more UEs that includes the first UE and a second UE of the group of UEs;

receive, in the groupcast sidelink grant, respective identifiers of the first UE and the one or more UEs, an identifier of the second UE, a subset of one or more transmission beams for transmission of a groupcast sidelink message, and a subset of one or more reception beams for reception of the groupcast sidelink message; and monitor the time-frequency resources for a groupcast sidelink communication from the second UE based at least in part on at least one reception beam of the subset of one or more reception beams indicated via the groupcast sidelink grant.

42. The apparatus of claim 41, wherein the processor is further configured to:

receive the groupcast sidelink grant in a groupcast transmission or a dedicated transmission from the network node.

43. The apparatus of claim 41, wherein the processor is further configured to:

receive the groupcast sidelink grant in a radio resource control (RRC) message, a medium access control (MAC) control element (MAC-CE), a downlink control information (DCI) transmission, or any combination thereof.

44. A non-transitory computer-readable medium storing code for wireless communication at a first user equipment (UE), the code comprising instructions executable by a processor to:

transmit, to a network node, a sidelink scheduling request for groupcast sidelink communications with a set of UEs;

transmit, in the sidelink scheduling request, an indication of a set of transmission beams for the groupcast sidelink communications;

receive, from the network node based at least in part on the sidelink scheduling request, a groupcast sidelink grant that indicates time-frequency resources for groupcast sidelink communications between the first UE and one or more UEs of the set of UEs;

receive, in the groupcast sidelink grant, an identifier of the first UE, respective identifiers for each UE of the one or more UEs, and a subset of one or more transmission beams for transmission of a groupcast sidelink message, the subset of one or more transmission beams selected from the set of transmission beams indicated via the sidelink scheduling request; and transmit, via the time-frequency resources indicated by the groupcast sidelink grant and based at least in part on the subset of one or more transmission beams, the groupcast sidelink message to the one or more UEs.

45. The non-transitory computer-readable medium of claim 44, wherein the instructions are further executable by the processor to:

transmit, in the sidelink scheduling request, a group identifier associated with the set of UEs and the first UE, the identifier of the first UE, respective identifiers for each UE of the set of UEs, an amount of data corresponding to the groupcast sidelink message, or any combination thereof.

46. The non-transitory computer-readable medium of claim 44, wherein the instructions are further executable by the processor to:

transmit the sidelink scheduling request in a radio resource control (RRC) message, a medium access control (MAC) control element (MAC-CE), a scheduling request (SR), a buffer status report (BSR), or any combination thereof.

47. The non-transitory computer-readable medium of claim 44, wherein the instructions are further executable by the processor to:

receive, independent of the sidelink scheduling request, an indication to transmit one or more groupcast sidelink messages based at least in part on a size of a groupcast buffer of the first UE.

48. A non-transitory computer-readable medium storing code for wireless communications at a first user equipment (UE), the code comprising instructions executable by a processor to:

transmit, to a network node, a sidelink scheduling request for groupcast sidelink communications with a set of UEs;

transmit, in the sidelink scheduling request, an indication of a set of transmission beams for the groupcast sidelink communications;

receive, from the network node based at least in part on the sidelink scheduling request, a groupcast sidelink grant that indicates time-frequency resources for groupcast sidelink communications between the first UE and a plurality of UEs of the set of UEs;

receive, in the groupcast sidelink grant, a subset of one or more transmission beams for transmission of a groupcast sidelink message, the subset of one or more transmission beams selected from the set of transmission beams indicated via the sidelink scheduling request; and transmit, via the time-frequency resources indicated by the groupcast sidelink grant and using the subset of one or more transmission beams, a groupcast sidelink message to the plurality of UEs.

49. The non-transitory computer-readable medium of claim 48, wherein the instructions are further executable by the processor to:

transmit, in the sidelink scheduling request, a group identifier associated with the set of UEs and the first UE, an identifier of the first UE, respective identifiers for each UE of the set of UEs, an amount of data that corresponds to the groupcast sidelink message, or any combination thereof.

50. The non-transitory computer-readable medium of claim 48, wherein the instructions are further executable by the processor to:

receive, in the groupcast sidelink grant, an identifier of the first UE, respective identifiers for each UE of the plurality of UEs, or both.

51. A non-transitory computer-readable medium storing code for wireless communications at a network node, the code comprising instructions executable by a processor to:

receive a sidelink scheduling request for groupcast sidelink communications between a first user equipment (UE) and a group of UEs supported by the network node;

receive, in the sidelink scheduling request, an indication of a set of transmission beams for the groupcast sidelink communications;

transmit a groupcast sidelink grant that indicates a subset of one or more transmission beams from the set of transmission beams indicated via the sidelink scheduling request and time-frequency resources for groupcast sidelink communications between the first UE and one or more UEs of the group of UEs; and transmit, in the groupcast sidelink grant, an identifier of the first UE, respective identifiers for each UE of the one or more UEs, and the subset of one or more transmission beams selected from the set of transmission beams for transmission of a groupcast sidelink message.

52. The non-transitory computer-readable medium of claim 51, wherein the instructions are further executable by the processor to:

receive, in the sidelink scheduling request, a group identifier associated with the group of UEs, the identifier of the first UE, respective identifiers for each UE of the group of UEs, an amount of data that corresponds to the groupcast sidelink message for transmission by the first UE, or any combination thereof.

53. The non-transitory computer-readable medium of claim 51, wherein the instructions are further executable by the processor to:

determine the subset of one or more transmission beams for transmission of the groupcast sidelink message the set of transmission beams indicated via the sidelink scheduling request.

54. A non-transitory computer-readable medium storing code for wireless communications at a first user equipment (UE), the code comprising instructions executable by a processor to:

establish a connection with a network node that supports communications for a group of UEs including the first UE;

receive, from the network node, a groupcast sidelink grant that indicates time-frequency resources for groupcast sidelink communications between one or more UEs including the first UE and a second UE of the group of UEs;

receive, in the groupcast sidelink grant, respective identifiers of the first UE and the one or more UEs, an identifier of the second UE, a subset of one or more transmission beams for transmission of a groupcast sidelink message, and a subset of one or more reception beams for reception of the groupcast sidelink message; and monitor the time-frequency resources for a groupcast sidelink communication from the second UE based at least in part on at least one reception beam of the subset of one or more reception beams indicated via the groupcast sidelink grant.

55. The non-transitory computer-readable medium of claim 54, wherein the instructions are further executable by the processor to:

receive the groupcast sidelink grant in a groupcast transmission or a dedicated transmission from the network node.

56. The non-transitory computer-readable medium of claim 54, wherein the instructions are further executable by the processor to:

receive the groupcast sidelink grant in a radio resource control (RRC) message, a medium access control (MAC) control element (MAC-CE), a downlink control information (DCI) transmission, or any combination thereof.

* * * * *